US012812584B2

(12) United States Patent
Fahim et al.

(10) Patent No.: US 12,812,584 B2
(45) Date of Patent: Nov. 24, 2026

(54) USE OF AMBIENT INTERNET-OF-THINGS (IoT) DEVICES IN A POSITIONING ENVIRONMENT

(71) Applicant: QUALCOMM Incorporated, San Diego, CA (US)

(72) Inventors: Mohammad Tarek Fahim, San Diego, CA (US); Srinivas Yerramalli, San Diego, CA (US); Jing Sun, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 18/363,479

(22) Filed: Aug. 1, 2023

(65) Prior Publication Data

US 2025/0048309 A1 Feb. 6, 2025

(51) Int. Cl.

*H04W 64/00* (2009.01)
*H04L 5/00* (2006.01)
*H04W 24/10* (2009.01)

(52) U.S. Cl.

CPC ........... *H04W 64/00* (2013.01); *H04L 5/0051* (2013.01); *H04W 24/10* (2013.01)

(58) Field of Classification Search

CPC ... H04W 64/00; H04W 24/10; H04W 64/006; H04W 4/70; H04W 4/80; H04W 72/0453; H04W 4/38; H04W 72/0446; H04W 72/23; H04W 72/04; H04W 72/20; H04W 24/02; H04W 72/044; H04W 28/06; H04W 72/25; H04W 4/02; H04W 72/541; H04W 8/005; H04W 16/18; H04W 4/023; H04W 76/15; H04W 76/18; H04W 52/46; H04W 72/535; H04W 72/12; H04W 74/00; H04W 8/00; H04W 4/029; H04W 36/30; H04W 72/02; H04W 64/003; H04L 5/0051;

(Continued)

(56) References Cited

U.S. PATENT DOCUMENTS

2022/0369277 A1* 11/2022 Fara ...................... G01S 13/751
2023/0141393 A1* 5/2023 Elshafie ................ H04W 76/15 307/104

(Continued)

FOREIGN PATENT DOCUMENTS

WO WO-2022199785 A1 9/2022
WO WO-2023093645 A1 6/2023
WO WO-2023125986 A1 7/2023

OTHER PUBLICATIONS

International Search Report and Written Opinion—PCT/US2024/038950—ISA/EPO—Feb. 5, 2025.

(Continued)

*Primary Examiner* — Nimesh Patel
(74) *Attorney, Agent, or Firm* — Muncy, Geissler, Olds & Lowe, P.C.

(57) ABSTRACT

In an aspect, a user equipment (UE) may measure one or more positioning reference signals (PRS) transmitted by one or more transmission-reception-points (TRPs). The UE may measure one or more backscattered signals received from one or more ambient Internet-of-things (IoT) anchor devices, wherein the one or more backscattered signals correspond to the one or more PRS received at the one or more ambient IoT anchor devices.

17 Claims, 22 Drawing Sheets

(58) Field of Classification Search
CPC ....... H04L 5/0053; H04L 5/0048; H04L 5/00; H04L 5/001; H04L 27/26; H04L 25/0224; H04L 27/00; H04L 5/0007; H04L 2209/80; H04L 27/0014; H04L 2001/0097; H04L 25/03159; H04L 67/50; H04L 9/40; G01S 5/0236; G01S 7/006; G01S 13/003; G01S 13/765; G01S 13/876; G01S 5/00; G01S 5/0036; G01S 13/74; G01S 13/426; G01S 5/0295; G01S 2201/02; G01S 7/003; G01S 13/46; G01S 2013/462; G01S 2013/466; G01S 5/0009; G01S 17/10; G01S 17/89; G01S 17/95; G01S 17/04; G01S 13/751; G01S 5/0273; G01S 13/75; G01S 17/88; G01S 13/42; G01S 17/42; G01S 7/497; G01S 13/584; G01S 13/62; G01S 13/86; G01S 17/58; G01S 13/88; G01S 17/08; G01S 5/02; G01S 17/48; G01S 5/18; H04B 5/45; H04B 5/77; H04B 7/22; H04B 7/04013; H04B 1/59; H04B 17/318; H04B 1/38; H04B 7/0617; H04B 7/145; H04B 17/309; H04B 7/06952; H04B 7/0632; H04B 17/328; H04B 17/336; H04B 7/0413; H04B 7/0695; H04B 7/12; H04B 7/15507; H04B 7/15528; H04B 1/69; H04B 10/071; H04B 17/345; H04B 17/0617; H04B 7/088; H04B 10/2581; G16Y 30/00; G16Y 40/00; G16Y 10/75; G16Y 20/10; G16Y 30/10; G16Y 40/20; G16Y 40/50; Y02D 30/70; H04J 11/00; H04J 2011/0009; G01N 2021/4709; G01N 33/0031; G01N 2201/06113; G01N 21/532; G01N 2021/1765; G01N 21/17; G01N 2021/6421; G01N 2021/4711; G01N 2201/1244; G06V 10/60; G06V 20/13; G06V 10/82; G06V 20/176; G06V 20/56; G06V 20/52; G06V 20/64; G06V 10/143; G06V 40/19
See application file for complete search history.

(56) References Cited

U.S. PATENT DOCUMENTS

| | | | | |
|---|---|---|---|---|
| 2024/0313870 | A1* | 9/2024 | Li | H04B 7/22 |
| 2024/0349229 | A1* | 10/2024 | Jiang | G01S 7/006 |
| 2025/0254651 | A1* | 8/2025 | Barbu | G01S 13/765 |
| 2025/0324314 | A1* | 10/2025 | Xu | H04L 1/1829 |

OTHER PUBLICATIONS

OPPO: "Positioning Technologies for Rel-19 Ambient IoT", RWS-230317, 3rd Generation Partnership Project, Mobile Competence Centre, 650, Route Des Lucioles, F-06921 Sophia-antipolis Cedex, France, No. Taipei, Jun. 15, 2023-Jun. 16, 2023, Jun. 11, 2023, 15 pages, XP052510056, pp. 8-14.

Partial International Search Report—PCT/US2024/038950—ISA/EPO—Nov. 8, 2024.

Xu G., et al., "3-D Indoor Device-Free Object Detection by Passive Radio Frequency Identification", IEEE Transactions on Instrumentation and Measurement, IEEE, USA, vol. 70, Feb. 12, 2021, 13 Pages, XP011839511, figures 1, 3, 7-8 sections: II. Problem Formulation and Signal Processing; III. System Setup and Preliminary Results, IV. Experimental Results.

* cited by examiner

USE OF AMBIENT INTERNET-OF-THINGS (IoT) DEVICES IN A POSITIONING ENVIRONMENT

BACKGROUND OF THE DISCLOSURE

1. Field of the Disclosure

Aspects of the disclosure relate generally to wireless technologies.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes measuring one or more positioning reference signals (PRS) transmitted by one or more transmission-reception-points (TRPs); and measuring one or more backscattered signals received from one or more ambient Internet-of-things (IoT) anchor devices, wherein the one or more backscattered signals correspond to the one or more PRS received at the one or more ambient IoT anchor devices.

In an aspect, a method of wireless communication performed by a sensing entity includes measuring one or more first order reflections of a set of one or more sensing signals reflected by a target object; measuring one or more backscattered signals received from one or more ambient Internet-of-things (IoT) devices, wherein the one or more backscattered signals correspond to reflections of the set of one or more sensing signals reflected by the target object to the one or more ambient IoT devices; and determining, based on the measuring of the one or more first order reflections and the measuring of the one or more backscattered signals at least a range of the target object from the sensing entity, a range of the target object from the one or more ambient IoT devices, or a combination thereof.

In an aspect, a method of wireless communication performed by a transmission-reception-point (TRP) includes receiving, from a location server, a request for information relating to one or more ambient Internet-of-things (IoT) anchor devices within a positioning environment of the TRP; and transmitting, to the location server, the information relating to the one or more ambient IoT devices based on receiving the request for information relating to the one or more ambient IoT anchor devices.

In an aspect, a method of wireless communication performed by a sensing entity includes sending, to a network entity, a request for information associated with one or more ambient Internet-of-things (IoT) devices in a positioning environment; and receiving, from the network entity, the information associated with the one or more ambient IoT devices in response to the request for the information associated with ambient IoT information.

In an aspect, a user equipment (UE) includes one or more memories; one or more transceivers; and one or more processors communicatively coupled to the one or more memories and the one or more transceivers, the one or more processors, either alone or in combination, configured to: measure one or more positioning reference signals (PRS) transmitted by one or more transmission-reception-points (TRPs); and measure one or more backscattered signals received from one or more ambient Internet-of-things (IoT) anchor devices, wherein the one or more backscattered signals correspond to the one or more PRS received at the one or more ambient IoT anchor devices.

In an aspect, a sensing entity includes one or more memories; one or more transceivers; and one or more processors communicatively coupled to the one or more memories and the one or more transceivers, the one or more processors, either alone or in combination, configured to: measure one or more first order reflections of a set of one or more sensing signals reflected by a target object; measure one or more backscattered signals received from one or more ambient Internet-of-things (IoT) devices, wherein the one or more backscattered signals correspond to reflections of the set of one or more sensing signals reflected by the target object to the one or more ambient IoT devices; and determine, based on the measuring of the one or more first order reflections and the measuring of the one or more backscattered signals at least a range of the target object from the sensing entity, a range of the target object from the one or more ambient IoT devices, or a combination thereof.

In an aspect, a transmission-reception-point (TRP) includes one or more memories; one or more transceivers; and one or more processors communicatively coupled to the one or more memories and the one or more transceivers, the one or more processors, either alone or in combination, configured to: receive, via the one or more transceivers, from a location server, a request for information relating to one or more ambient Internet-of-things (IoT) anchor devices within a positioning environment of the TRP; and transmit, via the one or more transceivers, to the location server, the information relating to the one or more ambient IoT devices based on receiving the request for information relating to the one or more ambient IoT anchor devices.

In an aspect, a sensing entity includes one or more memories; one or more transceivers; and one or more processors communicatively coupled to the one or more memories and the one or more transceivers, the one or more processors, either alone or in combination, configured to: send, via the one or more transceivers, to a network entity, a request for information associated with one or more ambient Internet-of-things (IoT) devices in a positioning environment; and receive, via the one or more transceivers, from the network entity, the information associated with the one or more ambient IoT devices in response to the request for the information associated with ambient IoT information.

In an aspect, a user equipment (UE) includes means for measuring one or more positioning reference signals (PRS) transmitted by one or more transmission-reception-points (TRPs); and means for measuring one or more backscattered signals received from one or more ambient Internet-of-things (IoT) anchor devices, wherein the one or more backscattered signals correspond to the one or more PRS received at the one or more ambient IoT anchor devices.

In an aspect, a sensing entity includes means for measuring one or more first order reflections of a set of one or more sensing signals reflected by a target object; means for measuring one or more backscattered signals received from one or more ambient Internet-of-things (IoT) devices, wherein the one or more backscattered signals correspond to reflections of the set of one or more sensing signals reflected by the target object to the one or more ambient IoT devices; and means for determining, based on the measuring of the one or more first order reflections and the measuring of the one or more backscattered signals at least a range of the target object from the sensing entity, a range of the target object from the one or more ambient IoT devices, or a combination thereof.

In an aspect, a transmission-reception-point (TRP) includes means for receiving, from a location server, a request for information relating to one or more ambient Internet-of-things (IoT) anchor devices within a positioning environment of the TRP; and means for transmitting, to the location server, the information relating to the one or more ambient IoT devices based on receiving the request for information relating to the one or more ambient IoT anchor devices.

In an aspect, a sensing entity includes means for sending, to a network entity, a request for information associated with one or more ambient Internet-of-things (IoT) devices in a positioning environment; and means for receiving, from the network entity, the information associated with the one or more ambient IoT devices in response to the request for the information associated with ambient IoT information.

In an aspect, a non-transitory computer-readable medium stores computer-executable instructions that, when executed by a user equipment (UE), cause the UE to: measure one or more positioning reference signals (PRS) transmitted by one or more transmission-reception-points (TRPs); and measure one or more backscattered signals received from one or more ambient Internet-of-things (IoT) anchor devices, wherein the one or more backscattered signals correspond to the one or more PRS received at the one or more ambient IoT anchor devices.

In an aspect, a non-transitory computer-readable medium stores computer-executable instructions that, when executed by a sensing entity, cause the sensing entity to: measure one or more first order reflections of a set of one or more sensing signals reflected by a target object; measure one or more backscattered signals received from one or more ambient Internet-of-things (IoT) devices, wherein the one or more backscattered signals correspond to reflections of the set of one or more sensing signals reflected by the target object to the one or more ambient IoT devices; and determine, based on the measuring of the one or more first order reflections and the measuring of the one or more backscattered signals at least a range of the target object from the sensing entity, a range of the target object from the one or more ambient IoT devices, or a combination thereof.

In an aspect, a non-transitory computer-readable medium stores computer-executable instructions that, when executed by an transmission-reception-point (TRP), cause the TRP to: receive, from a location server, a request for information relating to one or more ambient Internet-of-things (IoT) anchor devices within a positioning environment of the TRP; and transmit, to the location server, the information relating to the one or more ambient IoT devices based on receiving the request for information relating to the one or more ambient IoT anchor devices.

In an aspect, a non-transitory computer-readable medium stores computer-executable instructions that, when executed by a sensing entity, cause the sensing entity to: send, to a network entity, a request for information associated with one or more ambient Internet-of-things (IoT) devices in a positioning environment; and receive, from the network entity, the information associated with the one or more ambient IoT devices in response to the request for the information associated with ambient IoT information.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
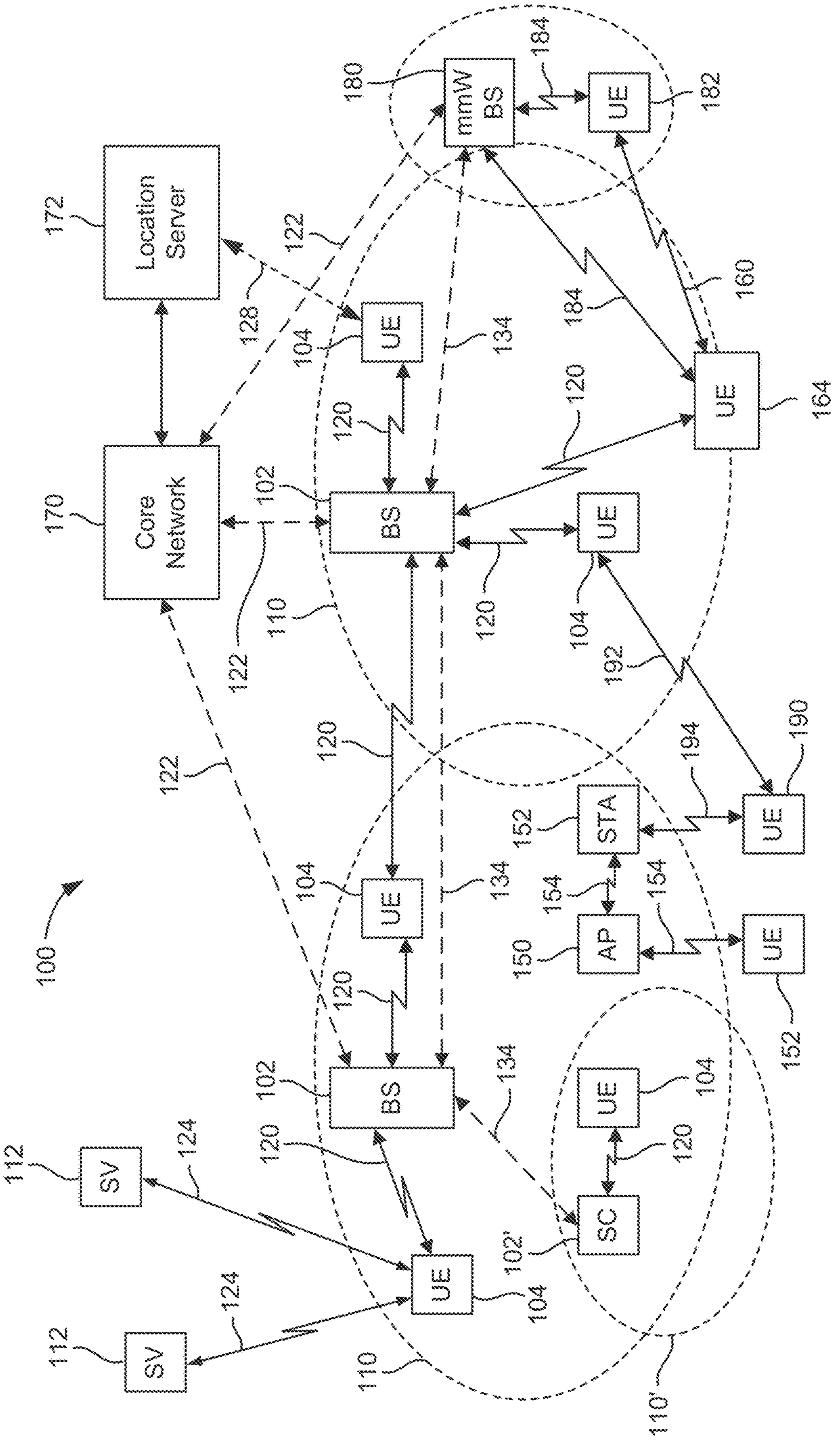
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to the use of ambient Internet-of-things (IoT) devices, such as radio frequency identity devices, electronic shelf labels, etc., to enhance positioning operations performed in a positioning environment. Some aspects more specifically relate to using ambient IoT devices to enhance radio frequency sensing of target objects devices in the positioning environment. Some aspects more specifically relate to replacing transmission-reception-point (TRP) anchors and/or base station anchors with ambient IoT anchor devices to reduce the cost and complexity of positioning environment in which the position of a device, such as a user equipment (UE) must be determined. Some aspects more specifically relate to various manners in which information relating to the ambient IoT devices may be transferred to a sensing entity for use in a positioning session. Some aspects more specifically relate to various manners in which information relating to the ambient IoT devices may be transferred to a location server for use in a positioning session.

Particular aspects of the subject matter described in this disclosure can be implemented to realize one or more of the following potential advantages. In some examples, by replacing TRP anchors and/or base stations with less costly ambient IoT anchor devices, the described techniques can be used to the reduce costs and complexity of positioning system deployments. In some examples, positioning of a target object in an RF sensing environment may be enhanced through the additional measurements that may be obtained using the backscattered signals provided by ambient IoT device in the sensing environment. In some examples, by setting forth various manners in which the information (e.g., capabilities, locations, etc.) associated with the ambient IoT in a positioning/sensing environment may be transferred between the various devices used in positioning operations, the use and communication of the ambient IoT device information by the various devices may be standardized.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2A:
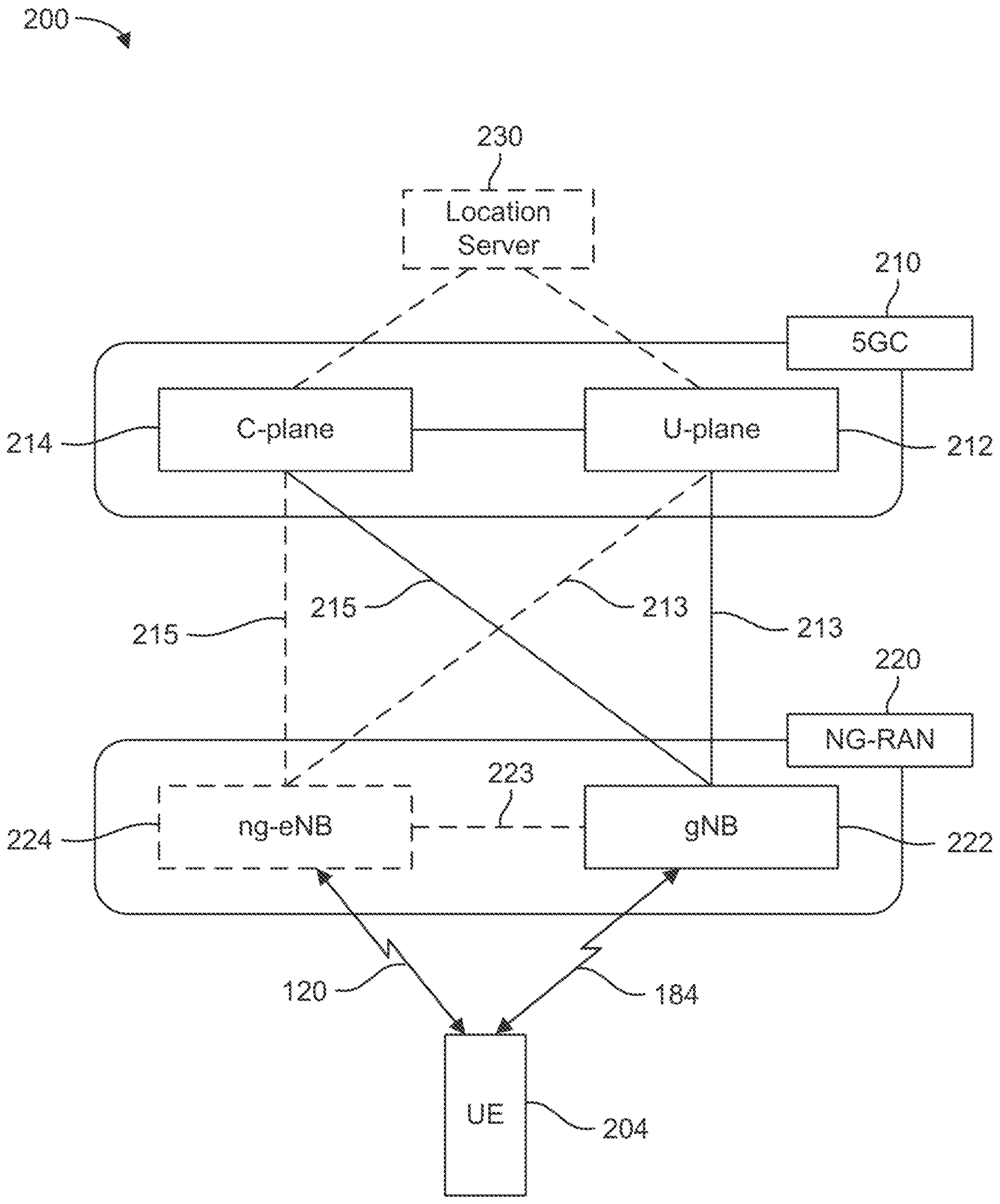
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
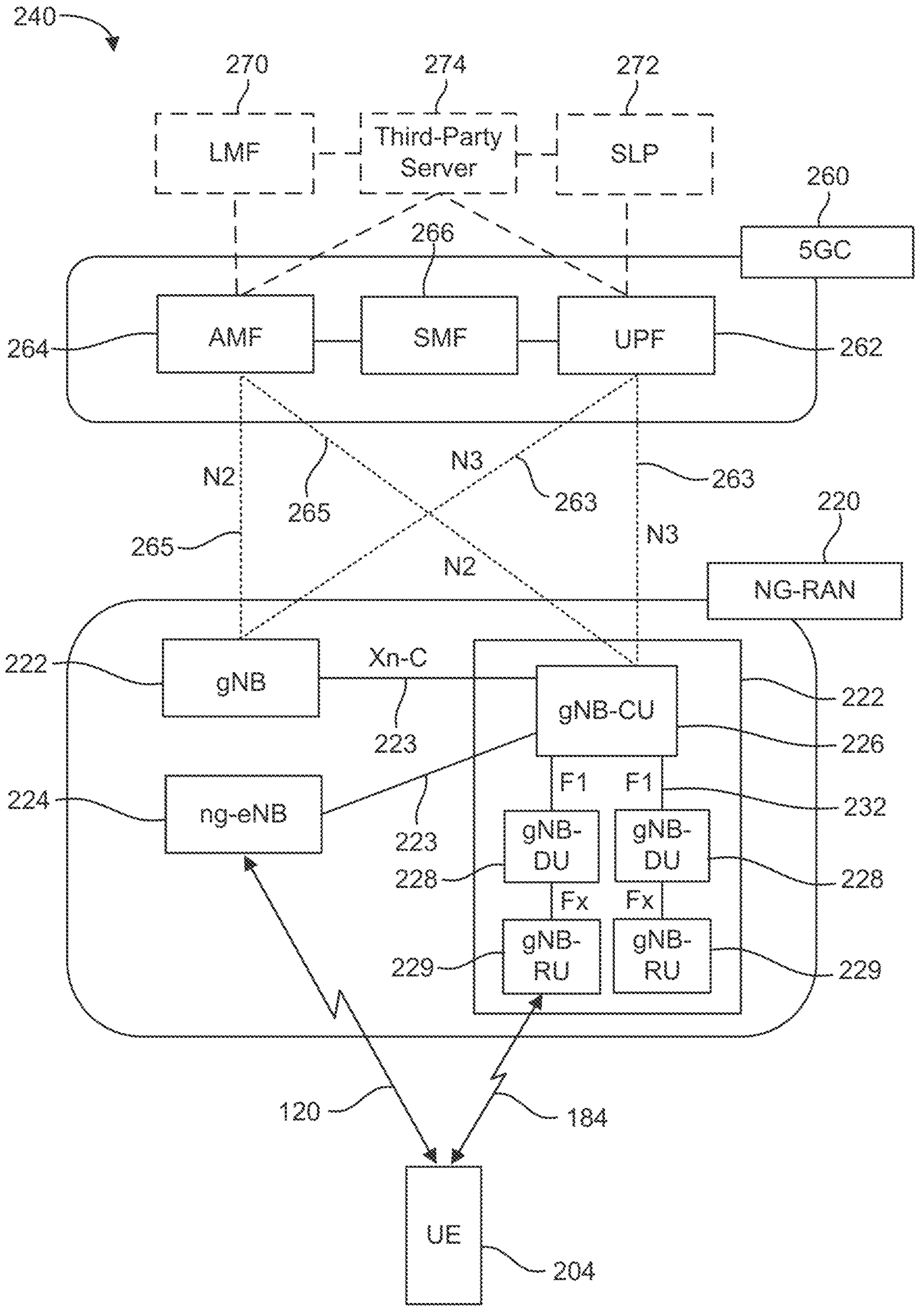

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
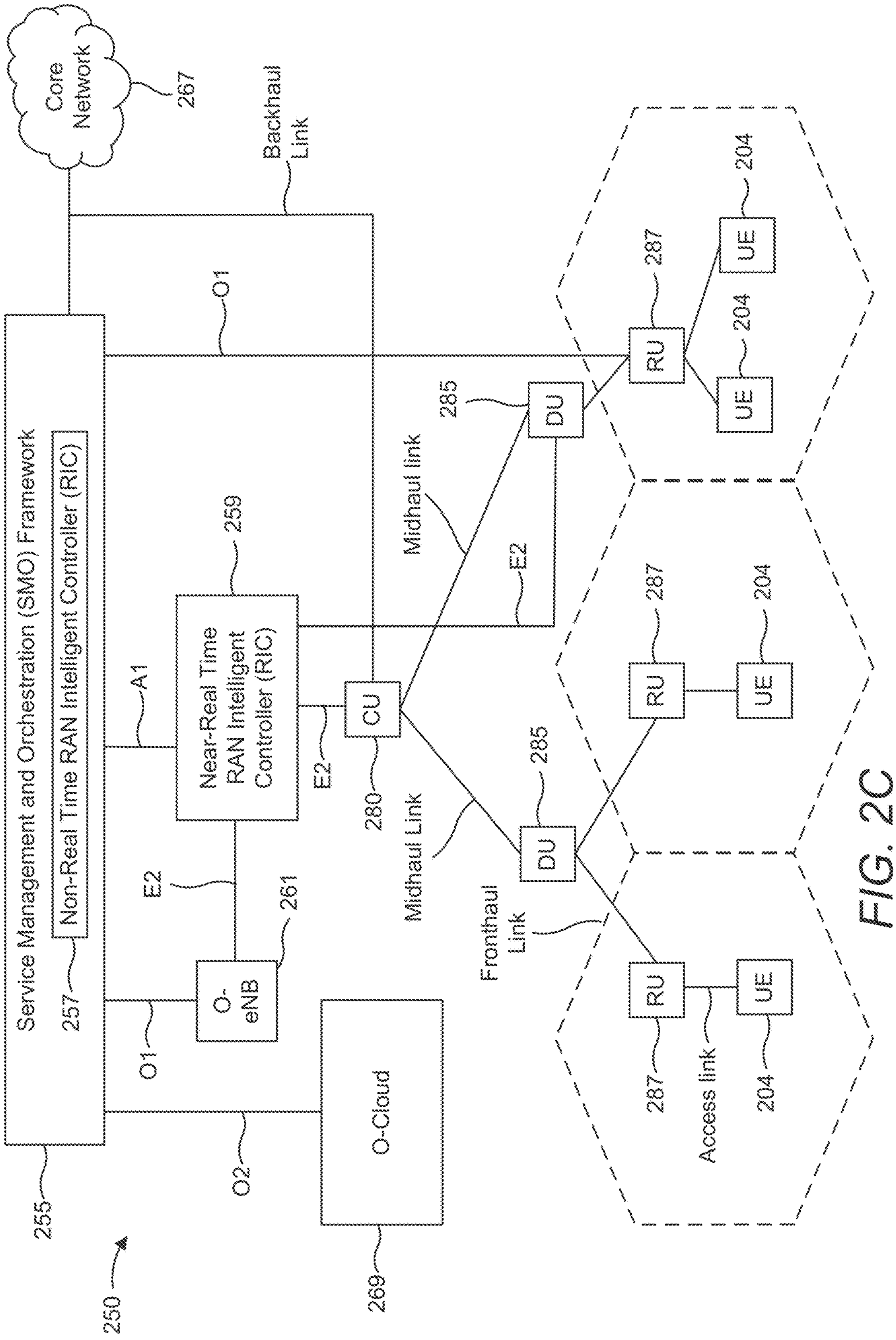

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration.

The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
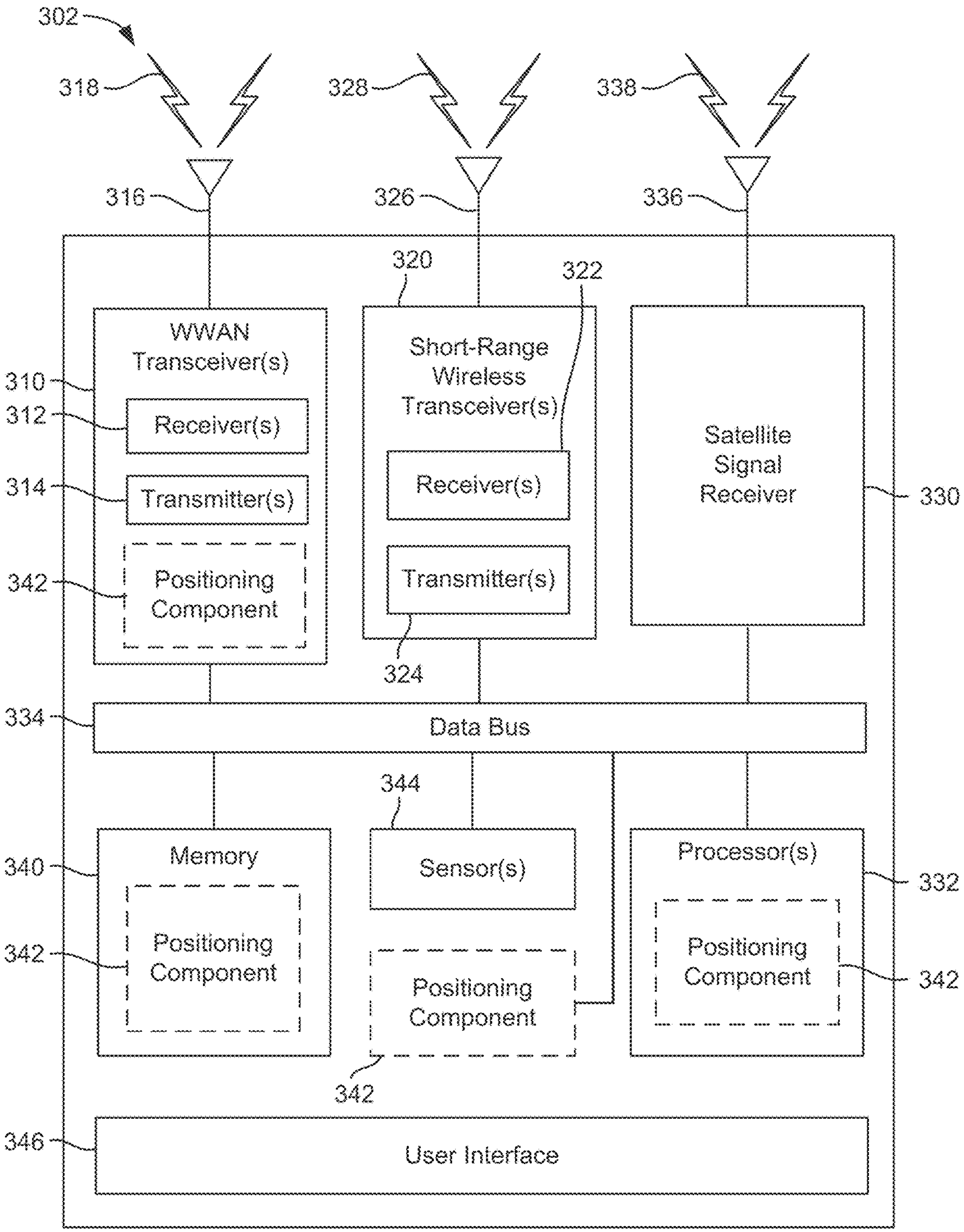
FIGS. 3A, 3B, and 3C are simplified block diagrams of several sample aspects of components that may be employed in a user equipment (UE), a base station, and a network entity, respectively, and configured to support communications as taught herein.
Figure 3B:
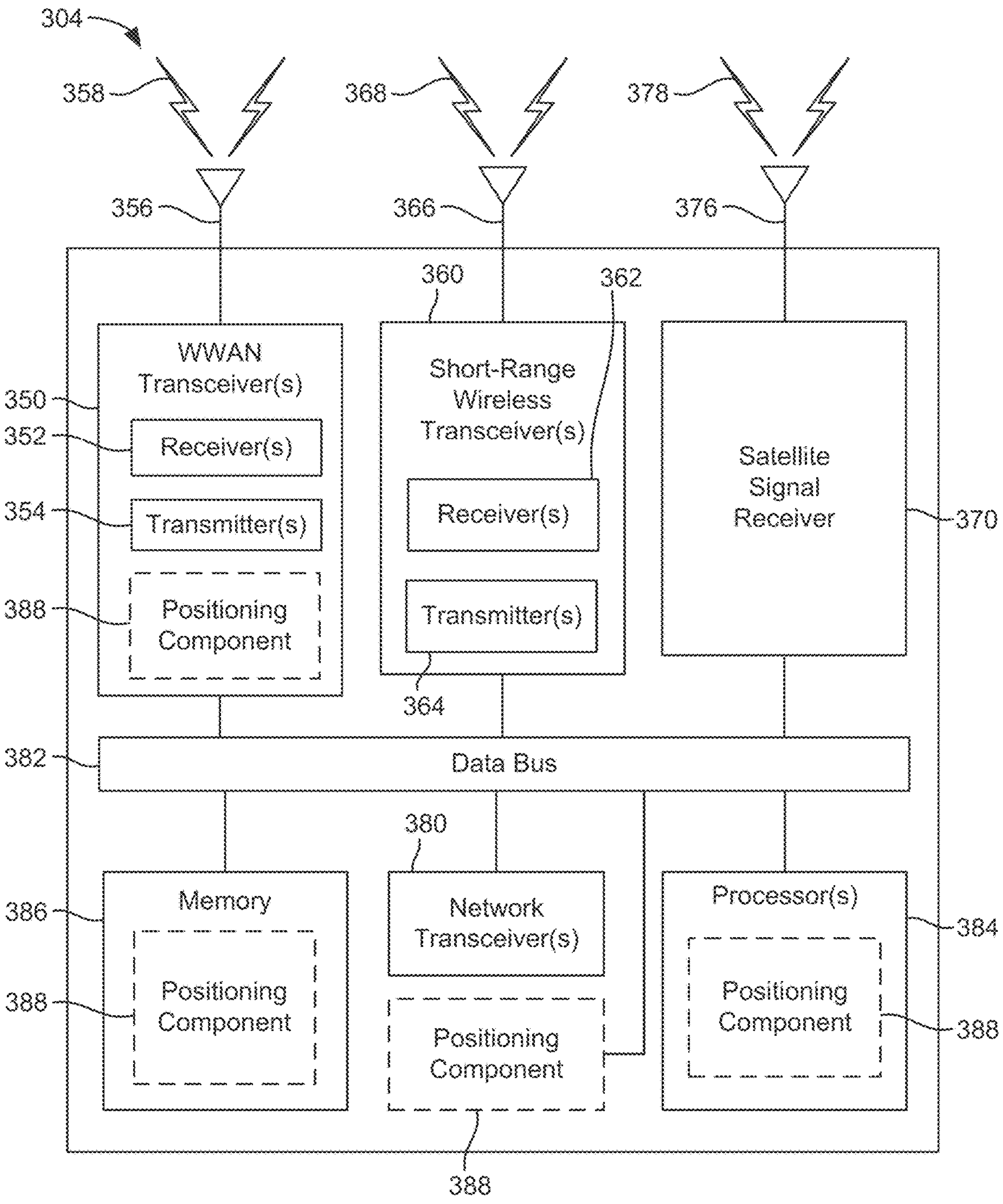
Figure 3C:
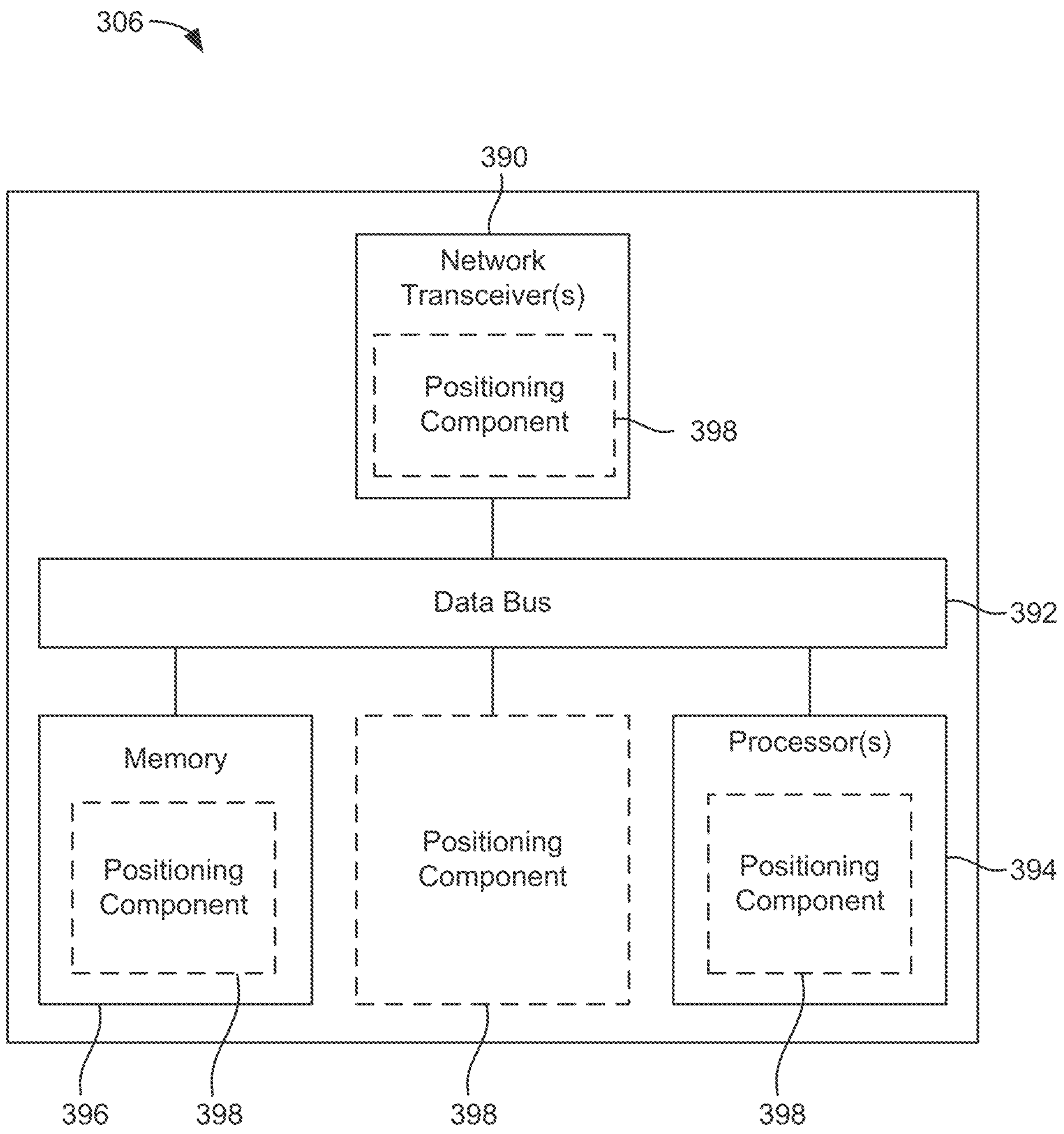

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum).

The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively.

Where the satellite signal receivers 330 and 370 are satellite positioning system receivers, the satellite positioning/communication signals 338 and 378 may be global positioning system (GPS) signals, global navigation satellite system (GLONASS®) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or personal computer (PC) or laptop may have Wi-Fi and/or BLUETOOTH® capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

Figure 4:
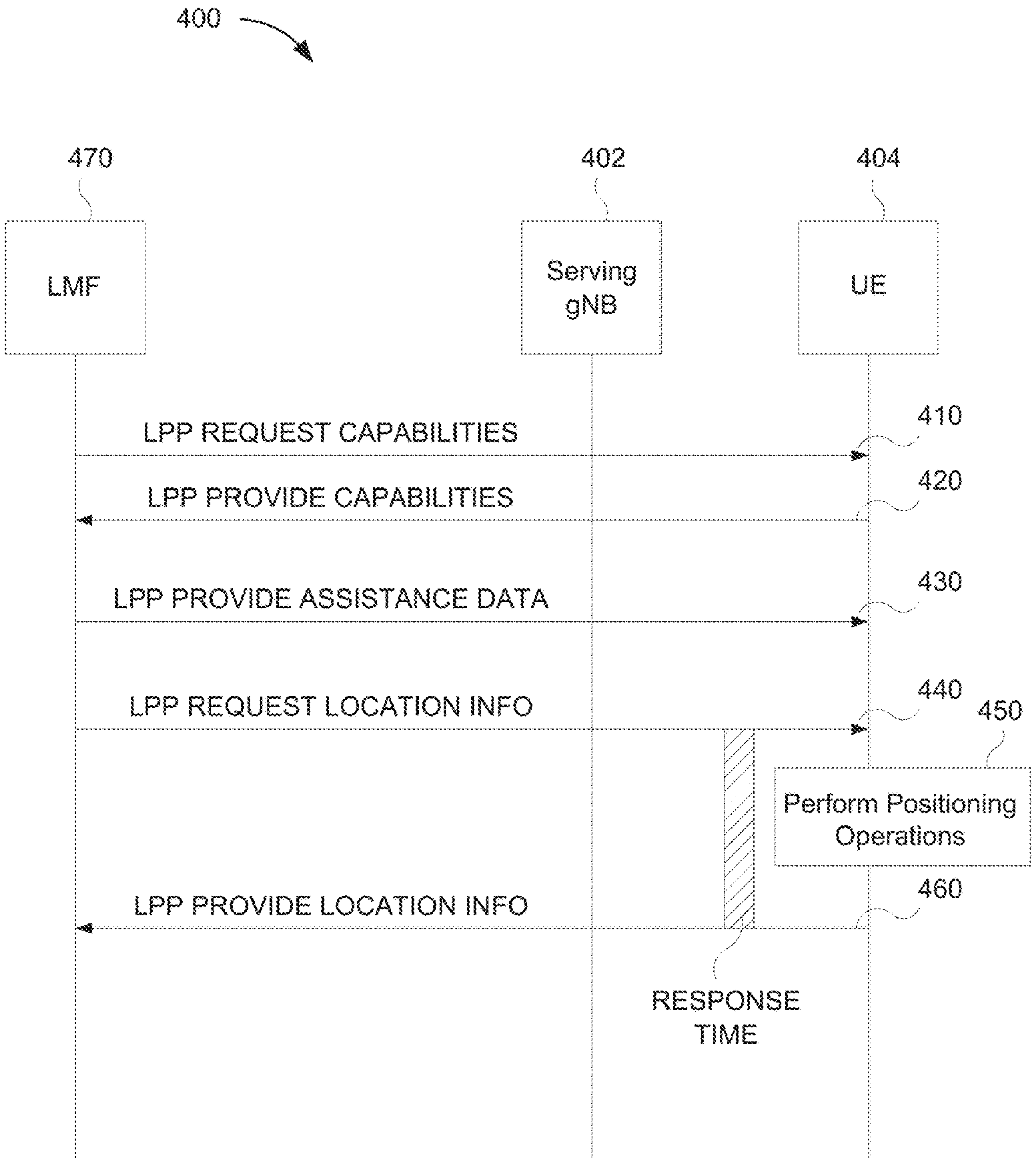
FIG. 4 illustrates an example Long-Term Evolution (LTE) positioning protocol (LPP) call flow between a UE and a location server for performing positioning operations.

FIG. 4 illustrates an example Long-Term Evolution (LTE) positioning protocol (LPP) procedure 400 between a UE 404 and a location server (illustrated as a location management function (LMF) 470) for performing positioning operations. As illustrated in FIG. 4, positioning of the UE 404 is supported via an exchange of LPP messages between the UE 404 and the LMF 470. The LPP messages may be exchanged between UE 404 and the LMF 470 via the UE's 404 serving base station (illustrated as a serving gNB 402) and a core network (not shown). The LPP procedure 400 may be used to position the UE 404 in order to support various location-related services, such as navigation for UE 404 (or for the user of UE 404), or for routing, or for provision of an accurate location to a public safety answering point (PSAP) in association with an emergency call from UE 404 to a PSAP, or for some other reason. The LPP procedure 400 may also be referred to as a positioning session, and there may be multiple positioning sessions for different types of positioning methods (e.g., downlink time difference of arrival (DL-TDOA), round-trip-time (RTT), enhanced cell identity (E-CID), etc.).

Initially, the UE 404 may receive a request for its positioning capabilities from the LMF 470 at stage 410 (e.g., an LPP Request Capabilities message). At stage 420, the UE 404 provides its positioning capabilities to the LMF 470 relative to the LPP protocol by sending an LPP Provide Capabilities message to LMF 470 indicating the position methods and features of these position methods that are supported by the UE 404 using LPP. The capabilities indicated in the LPP Provide Capabilities message may, in some aspects, indicate the type of positioning the UE 404 supports (e.g., DL-TDOA, RTT, E-CID, etc.) and may indicate the capabilities of the UE 404 to support those types of positioning.

Upon reception of the LPP Provide Capabilities message, at stage 420, the LMF 470 determines to use a particular type of positioning method (e.g., DL-TDOA, RTT, E-CID, etc.) based on the indicated type(s) of positioning the UE 404 supports and determines a set of one or more transmission-reception points (TRPs) from which the UE 404 is to measure downlink positioning reference signals or towards which the UE 404 is to transmit uplink positioning reference signals. At stage 430, the LMF 470 sends an LPP Provide Assistance Data message to the UE 404 identifying the set of TRPs.

In some implementations, the LPP Provide Assistance Data message at stage 430 may be sent by the LMF 470 to the UE 404 in response to an LPP Request Assistance Data message sent by the UE 404 to the LMF 470 (not shown in FIG. 4). An LPP Request Assistance Data message may include an identifier of the UE's 404 serving TRP and a request for the positioning reference signal (PRS) configuration of neighboring TRPs.

At stage 440, the LMF 470 sends a request for location information to the UE 404. The request may be an LPP Request Location Information message. This message usually includes information elements defining the location information type, desired accuracy of the location estimate, and response time (i.e., desired latency). Note that a low latency requirement allows for a longer response time while a high latency requirement requires a shorter response time. However, a long response time is referred to as high latency and a short response time is referred to as low latency.

Note that in some implementations, the LPP Provide Assistance Data message sent at stage 430 may be sent after the LPP Request Location Information message at 440 if, for example, the UE 404 sends a request for assistance data to LMF 470 (e.g., in an LPP Request Assistance Data message, not shown in FIG. 4) after receiving the request for location information at stage 440.

At stage 450, the UE 404 utilizes the assistance information received at stage 430 and any additional data (e.g., a desired location accuracy or a maximum response time) received at stage 440 to perform positioning operations (e.g., measurements of DL-PRS, transmission of UL-PRS, etc.) for the selected positioning method.

At stage 460, the UE 404 may send an LPP Provide Location Information message to the LMF 470 conveying the results of any measurements that were obtained at stage 450 (e.g., time of arrival (ToA), reference signal time difference (RSTD), reception-to-transmission (Rx-Tx), etc.) and before or when any maximum response time has expired (e.g., a maximum response time provided by the LMF 470 at stage 440). The LPP Provide Location Information message at stage 460 may also include the time (or times) at which the positioning measurements were obtained and the identity of the TRP(s) from which the positioning measurements were obtained. Note that the time between the request for location information at 440 and the response at 460 is the "response time" and indicates the latency of the positioning session.

The LMF 470 computes an estimated location of the UE 404 using the appropriate positioning techniques (e.g., DL-TDOA, RTT, E-CID, etc.) based, at least in part, on measurements received in the LPP Provide Location Information message at stage 460.

Figure 5:
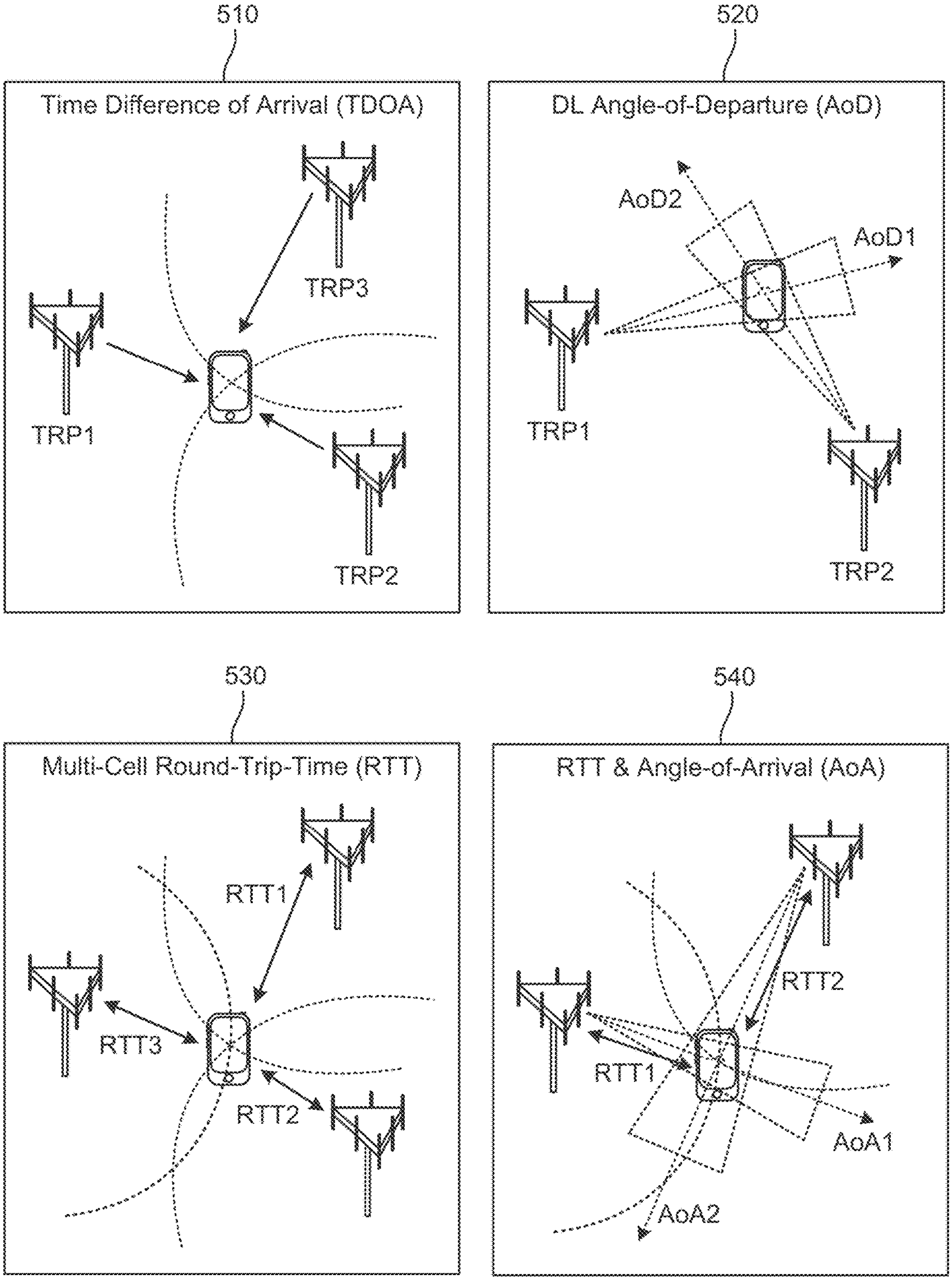
FIG. 5 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 5 illustrates examples of various positioning methods, according to aspects of the disclosure. In an OTDOA or DL-TDOA positioning procedure, illustrated by scenario 510, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 520, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as “multi-cell RTT” and “multi-RTT”). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 530, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 540.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Wireless communication signals (e.g., radio frequency (RF) signals configured to carry orthogonal frequency division multiplexing (OFDM) symbols in accordance with a wireless communications standard, such as LTE, NR, etc.) transmitted between a UE and a base station can be used for environment sensing (also referred to as “RF sensing” or “radar”). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, such as Wi-Fi signals, etc. As a particular example, the wireless communication signals may be an OFDM waveform as utilized in LTE and NR. High-frequency communication signals, such as millimeter wave (mmW) RF signals, are especially beneficial to use as radar signals because the higher frequency provides, at least, more accurate range (distance) detection.

Possible use cases of RF sensing include health monitoring use cases, such as heartbeat detection, respiration rate monitoring, and the like, gesture recognition use cases, such as human activity recognition, keystroke detection, sign language recognition, and the like, contextual information acquisition use cases, such as location detection/tracking, direction finding, range estimation, and the like, and automotive radar use cases, such as smart cruise control, collision avoidance, and the like.

Figure 6A:
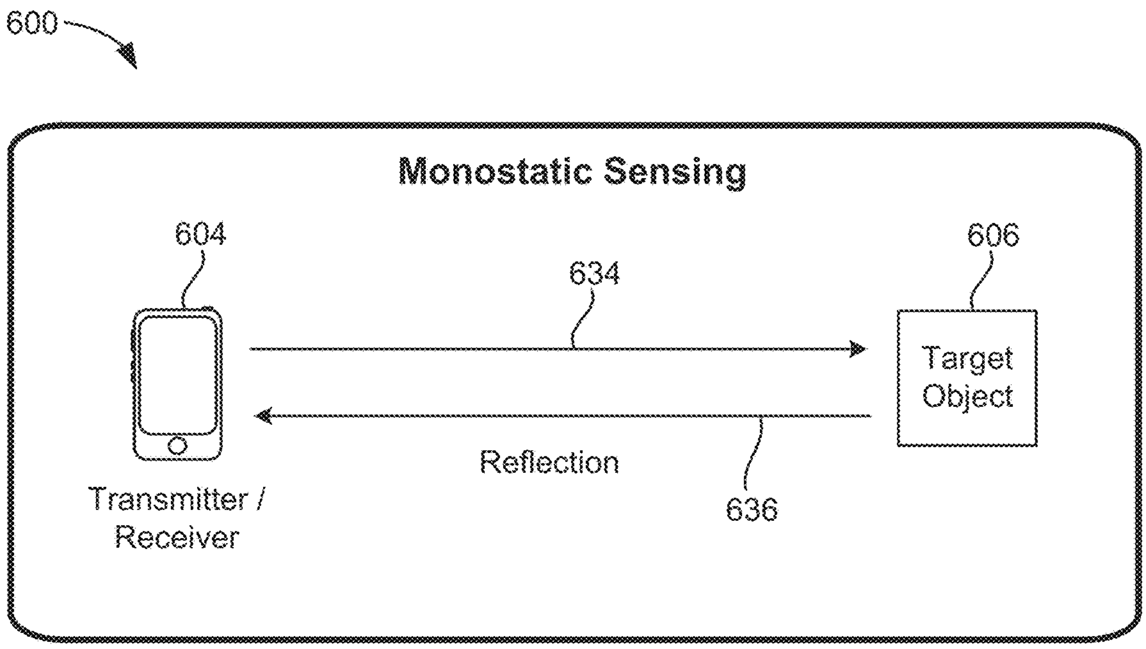
FIGS. 6A and 6B illustrate different types of radar sensing, according to aspects of the disclosure.
Figure 6B:
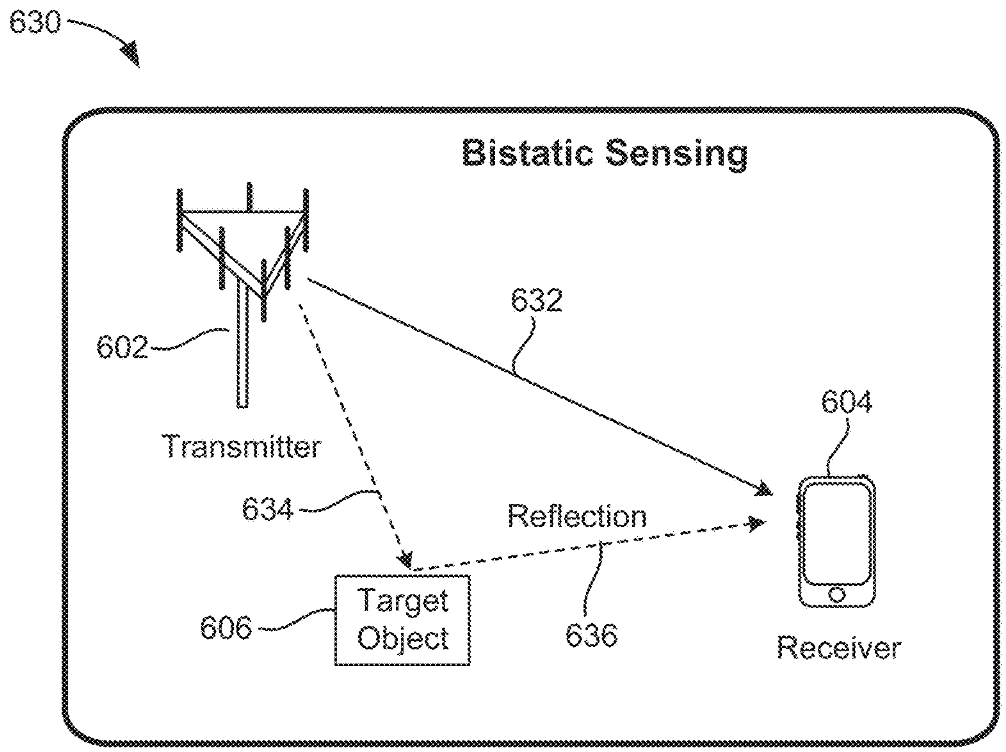

There are different types of sensing, including monostatic sensing (also referred to as "active sensing") and bistatic sensing (also referred to as "passive sensing"). FIGS. 6A and 6B illustrate these different types of sensing. Specifically, FIG. 6A is a diagram 600 illustrating a monostatic sensing scenario and FIG. 6B is a diagram 630 illustrating a bistatic sensing scenario. In FIG. 6A, the transmitter (Tx) and receiver (Rx) are co-located in the same sensing device 604 (e.g., a UE). The sensing device 604 transmits one or more RF sensing signals 634 (e.g., uplink or sidelink positioning reference signals (PRS) where the sensing device 604 is a UE), and some of the RF sensing signals 634 reflect off a target object 606. The sensing device 604 can measure various properties (e.g., times of arrival (ToAs), angles of arrival (AoAs), phase shift, etc.) of the reflections 636 of the RF sensing signals 634 to determine characteristics of the target object 606 (e.g., size, shape, speed, motion state, etc.).

In FIG. 6B, the transmitter (Tx) and receiver (Rx) are not co-located, that is, they are separate devices (e.g., a UE and a base station). Note that while FIG. 6B illustrates using a downlink RF signal as the RF sensing signal 632, uplink RF signals or sidelink RF signals can also be used as RF sensing signals 632. In a downlink scenario, as shown, the transmitter is a base station and the receiver is a UE, whereas in an uplink scenario, the transmitter is a UE and the receiver is a base station.

Referring to FIG. 6B in greater detail, the transmitter device 602 transmits RF sensing signals 632 and 634 (e.g., positioning reference signals (PRS)) to the sensing device 604, but some of the RF sensing signals 634 reflect off a target object 606. The sensing device 604 (also referred to as the "sensing device") can measure the times of arrival (ToAs) of the RF sensing signals 632 received directly from the transmitter device and the ToAs of the reflections 636 of the RF sensing signals 634 reflected from the target object 606.

More specifically, as described above, a transmitter device (e.g., a base station) may transmit a single RF signal or multiple RF signals to a sensing device (e.g., a UE). However, the receiver may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 6B, the RF sensing signals 632 followed the LOS path between the transmitter device 602 and the sensing device 604, and the RF sensing signals 634 followed an NLOS path between the transmitter device 602 and the sensing device 604 due to reflecting off the target object 606. The transmitter device 602 may have transmitted multiple RF sensing signals 632, 634, some of which followed the LOS path and others of which followed the NLOS path. Alternatively, the transmitter device 602 may have transmitted a single RF sensing signal in a broad enough beam that a portion of the RF sensing signal followed the LOS path (RF sensing signal 632) and a portion of the RF sensing signal followed the NLOS path (RF sensing signal 634).

Based on the ToA of the LOS path, the ToA of the NLOS path, and the speed of light, the sensing device 604 can determine the distance to the target object(s). For example, the sensing device 604 can calculate the distance to the target object as the difference between the ToA of the LOS path and the ToA of the NLOS path multiplied by the speed of light. In addition, if the sensing device 604 is capable of receive beamforming, the sensing device 604 may be able to determine the general direction to a target object as the direction (angle) of the receive beam on which the RF sensing signal following the NLOS path was received. That is, the sensing device 604 may determine the direction to the target object as the angle of arrival (AoA) of the RF sensing signal, which is the angle of the receive beam used to receive the RF sensing signal. The sensing device 604 may then optionally report this information to the transmitter device 602, its serving base station, an application server associated with the core network, an external client, a third-party application, or some other sensing entity. Alternatively, the sensing device 604 may report the ToA measurements to the transmitter device 602, or other sensing entity (e.g., if the sensing device 604 does not have the processing capability to perform the calculations itself), and the transmitter device 602 may determine the distance and, optionally, the direction to the target object 606.

Note that if the RF sensing signals are uplink RF signals transmitted by a UE to a base station, the base station would perform object detection based on the uplink RF signals just like the UE does based on the downlink RF signals.

Like conventional radar, wireless communication-based radar signal can be used to estimate the range (distance), velocity (Doppler), and angle (AoA) of a target object. However, the performance (e.g., resolution and maximum values of range, velocity, and angle) may depend on the design of the reference signal.

Radio frequency identification (RFID) is a rapidly growing technology impacting many industries benefiting from automatic identity capture and management due to its economic potential for asset/inventory/resource management inside and outside the warehouse, machine to machine scenarios, IoT scenarios, sustainable sensor networks in factories and/or agriculture, smart homes, and the like. RFID consists of small transponders, or "tags," that emit an information-bearing signal upon receiving an energizing signal. RFID "readers" emit energizing signals to activate and "read" the information stored by RFID tags. RFID tags can be attached to inventory items or other assets to track the assets' movements through the supply chain. RFID tags can be operated without battery at low operating expense, low maintenance cost, and long-life cycle.

There are different types of RFID tags: passive, semi-passive, and active. Passive tags have no power source, and instead receive energy signals from an RFID reader or harvest energy from ambient wireless signals to power the transmission/reception circuitry, where the transmitted signal is typically backscatter modulated. Passive tags therefore have limited computational capacity and no ability for advanced signal processing (e.g., analog-to-digital converter (ADC), digital-to-analog converter (DAC)). Semi-passive tags have an on-board limited power source that can be used to energize their microchip. Active tags have an on-board power source and are able to transmit whether a reader is transmitting within their range or not.

Figure 7:
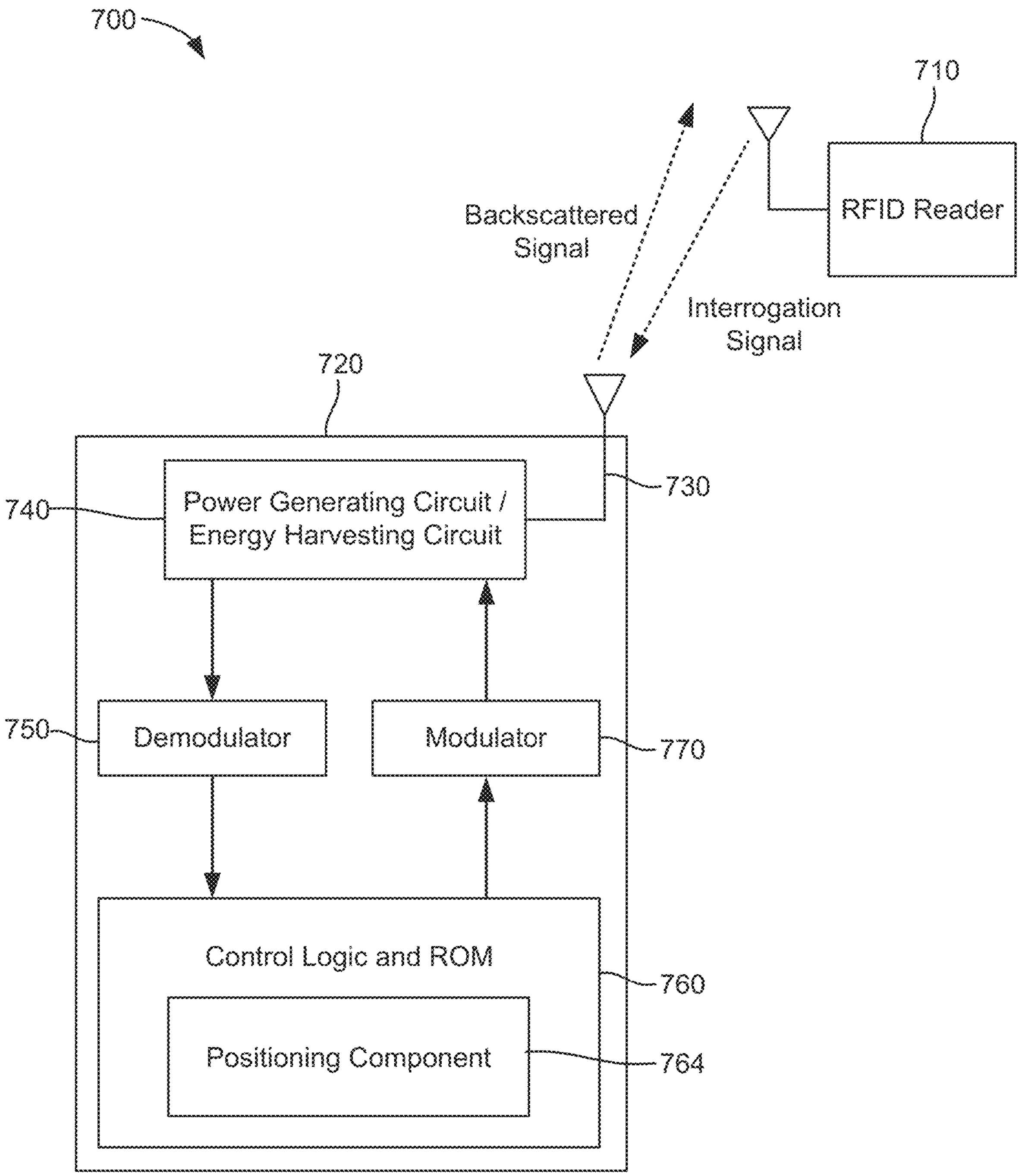
FIG. 7 is a diagram of an example architecture of a passive radio frequency identification (RFID) scenario, according to aspects of the disclosure.

FIG. 7 is a diagram 700 of an example architecture of a passive RFID scenario, according to aspects of the disclosure. As shown in FIG. 7, an RFID reader device 710 transmits an energy signal (referred to herein as an "interrogation signal") towards a passive RFID tag 720. An antenna 730 of the passive RFID tag 720 receives the interrogation signal. A power generating circuit 740 (also referred to as an energy harvesting circuit) extracts power/energy from the received interrogation signal and supplies power to all the components of the passive RFID tag 720. The demodulator 750 demodulates the interrogation signal and transmits the demodulated signal to the control logic 760 (e.g., an application-specific integrated circuit (ASIC)) for processing. The control logic 760 may also include a read-only memory (ROM) (not shown) and a positioning component 764 configured to cause the passive RFID tag 720, in conjunction with the other components, to perform the operations described herein. The control logic 760 generates a response signal and transmits it to the modulator 770, which generates a modulated backscattered signal and transmits it to the power generating circuit 740. The power generating circuit 740 then transmits the backscattered signal over the antenna 730.

Figure 8:
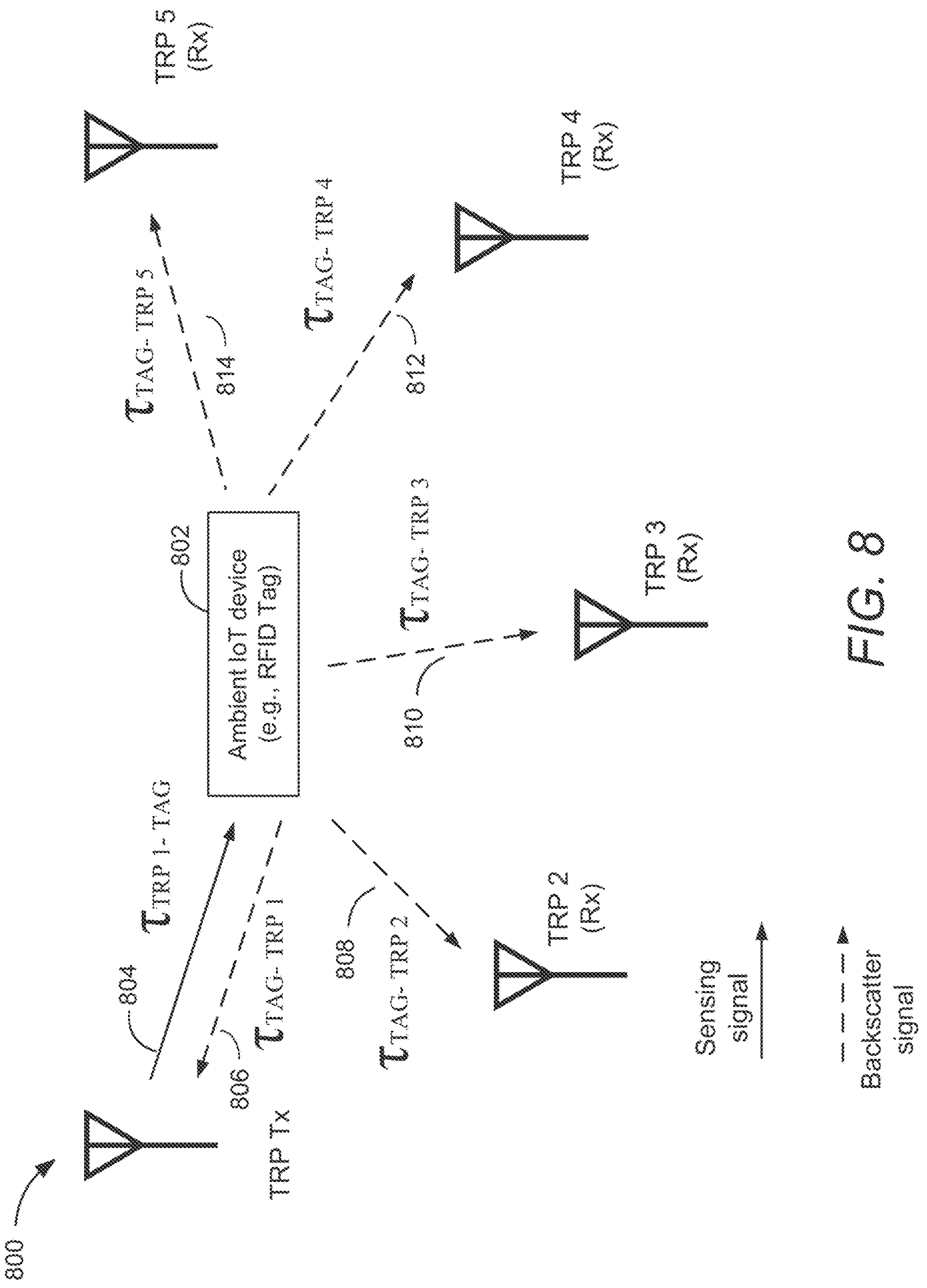
FIG. 8 shows an example scenario using backscatter-based positioning to determine a position of an ambient Internet-of-things (IoT) device, according to aspects of the disclosure.

FIG. 8 shows an example scenario 800 using backscatter-based positioning to determine a position of an ambient IoT device 802 (e.g., RFID tag), according to aspects of the disclosure. Baseline backscatter-based positioning typically involves at least one transmission TRP acting as a reader, at least one RFID tag that is to be positioned, and multiple reception TRPs to measure the backscatter signal from the RFID tag. In FIG. 8, TRP 1 operates as the transmission/reader TRP and transmits one or more sensing signals 804 (e.g., PRS), which are backscattered by the RFID tag 802. The backscattered signals may be received by TRP 1 as well as by reception TRPs TRP 2 through TRP 5. And received by. In this example, TRP 1 receives backscattered signals along propagation path 806, TRP 2 receives backscattered signals along propagation path 808, TRP 3 receives backscattered signals along propagation path 810, TRP 4 receives backscattered signals along propagation path 812, and TRP 5 receives backscattered signals along propagation path 814.

Given the received backscatter signals at the TRPs, the following propagation time estimates may be obtained: $\tau_1=\tau_{TRP\ 1\text{-}TAG}+\tau_{TAG\text{-}TRP1}$ $\tau_2=\tau_{TRP\ 1\text{-}TAG}+\tau_{TAG\text{-}TRP2}$ $\tau_3=\tau_{TRP\ 1\text{-}TAG}+\tau_{TAG\text{-}TRP3}$ $\tau_4=\tau_{TRP\ 1\text{-}TAG}+\tau_{TAG\text{-}TRP4}$ $\tau_5=\tau_{TRP\ 1\text{-}TAG}+\tau_{TAG\text{-}TRP5}$ The measurements for $\tau_1$, $\tau_2$, $\tau_3$, $\tau_4$, $\tau_5$ can be used in classical positioning techniques to obtain the location of the tag 802. For TDOA positioning the following equation may be used:

$$\nabla\tau_{i,ref} = \tau_{TAG-rxi} - \tau_{TAG-rx\_ref} = \tau_i - \tau_{ref}$$

where $\nabla\tau_i$, ref is the TDOA corresponding to a difference between a TOA at a receiver with index i and a TOA at a reference receiver (e.g., $r_{x\_ref}$).

Certain aspects of the disclosure are implemented with a recognition that a positioning environment typically includes a number of anchor TRPs that are located at known locations within the positioning environment. Multiple anchor TRPs are typically employed, even in positioning environments having a limited area (e.g., a factory floor).

Figure 9:
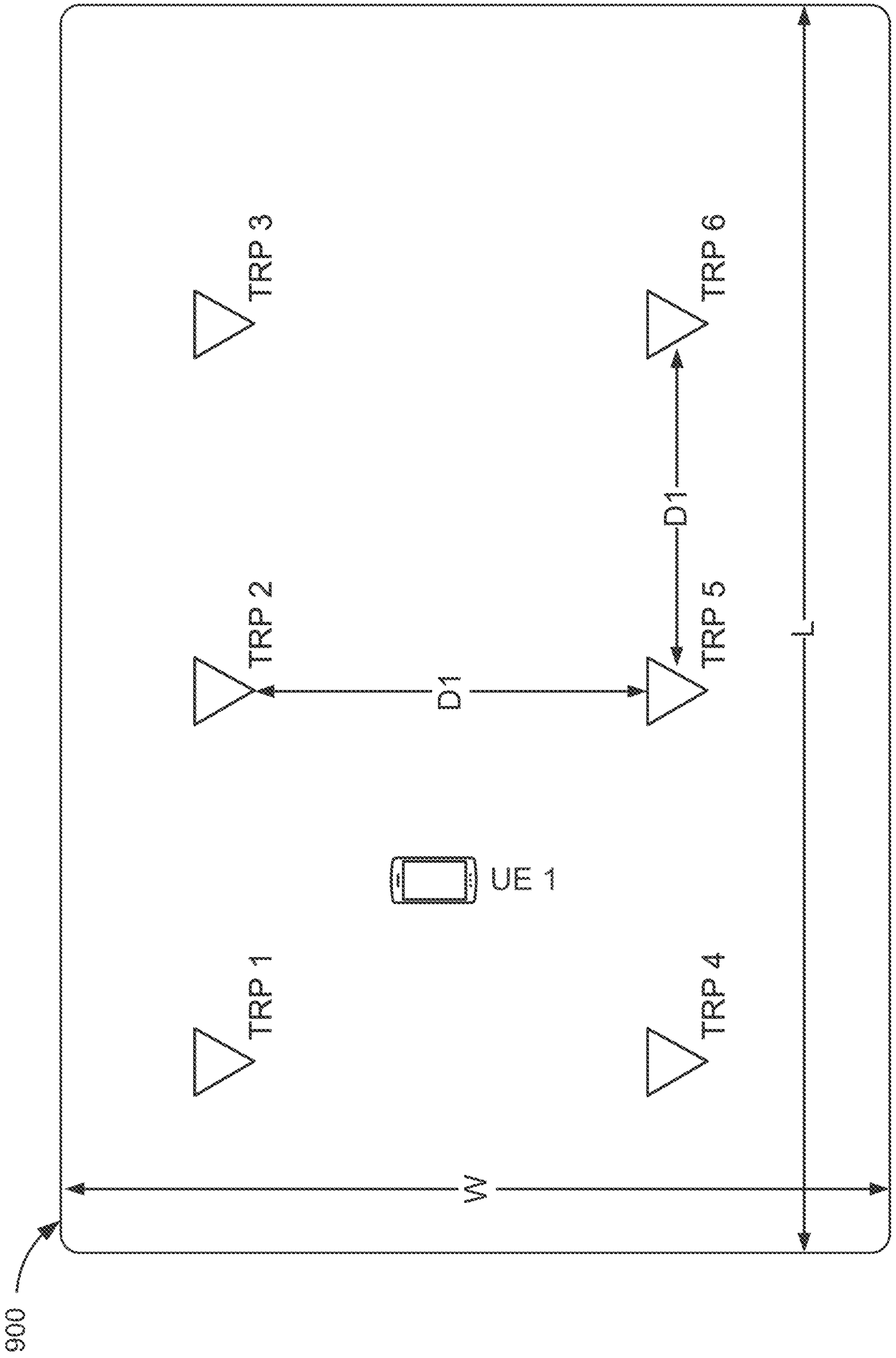
FIG. 9 shows an example positioning environment for positioning a UE in a small layout deployment, according to aspects of the disclosure.

FIG. 9 shows an example positioning environment 900 for positioning a UE, labeled UE 1, in a small layout deployment (e.g., small indoor factory plan), according to aspects of the disclosure. In certain aspects, the example positioning environment 900 may have a length L=30 m and a width W=20 m. For precise positioning, at least four base stations/TRPs should be installed in the positioning environment 900. The positioning environment 900 in this example includes six TRPs, labeled TRP 1 through TRP 6, where the adjacent TRPs along the width W and length L of the positioning environments 900 are equidistantly spaced from one another by a distance D1 (e.g., 10 m). Certain aspects of the disclosure are implemented with a recognition that the installation of such a large number of base stations/TRPs within such a small area may not be cost efficient. Accordingly, certain aspects of the disclosure are implemented with a goal of installing fewer base stations/TRPs in a positioning environment, such as positioning environment 900, to reduce deployment complexity and costs while maintaining precise positioning accuracy.

Figure 10:
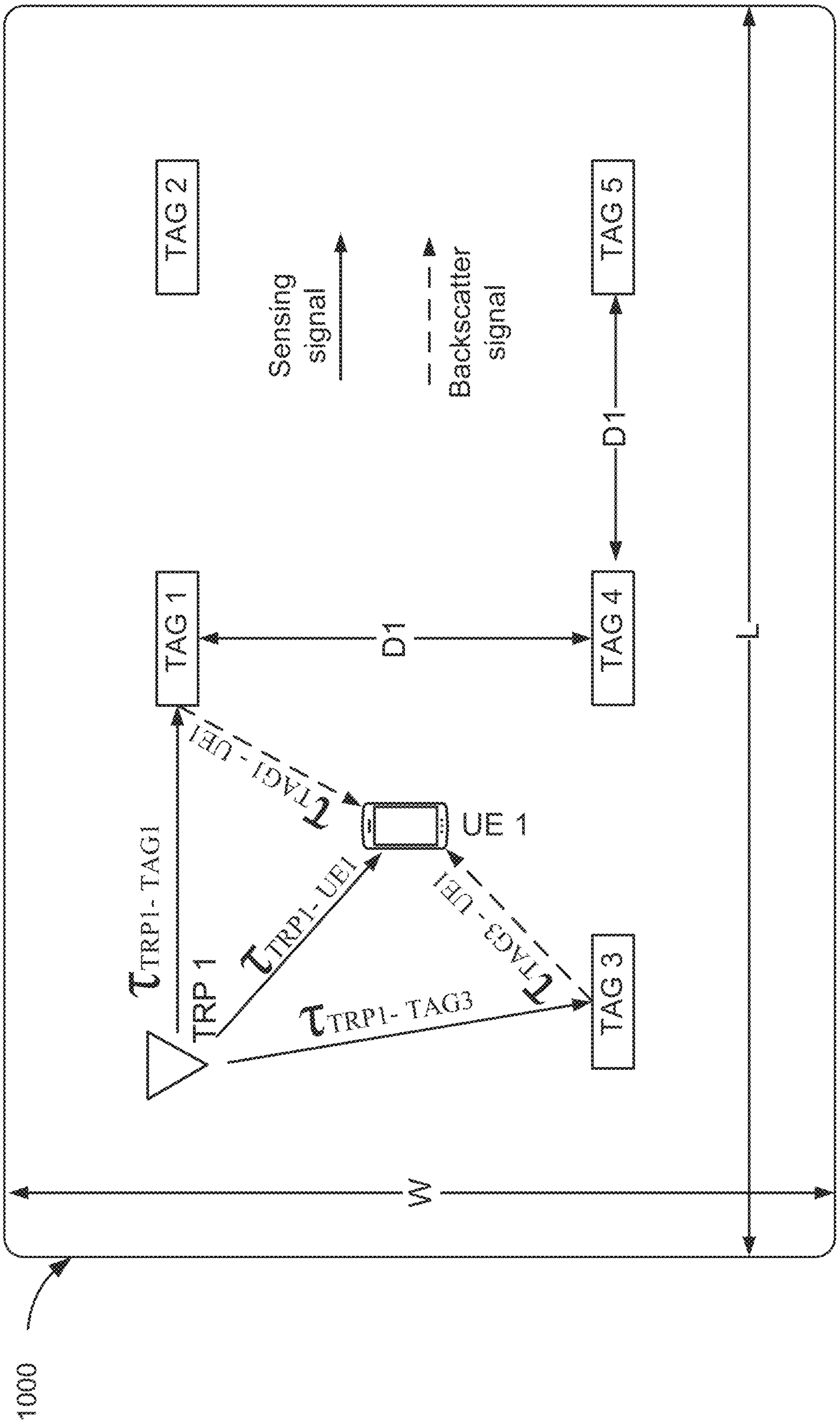
FIG. 10 shows an example positioning environment including ambient IoT anchor devices, according to aspects of the disclosure.

Certain aspects of the disclosure are implemented with a recognition that one or more of the base stations/TRPs in the positioning environment 900 may be replaced by anchor ambient IoT devices (e.g., RFID tags). FIG. 10 shows an example positioning environment 1000 including ambient IoT anchor devices, according to aspects of the disclosure. In accordance with certain aspects of the disclosure, specific base station/TRPs shown in the positioning environment 900 have been replaced by anchor RFID tags, labeled TAG 1 through TAG 5, in the positioning environment 1000 shown in FIG. 10. Here, the example positioning environment 1000 includes a single TRP/base station, labeled TRP 1. In this example, TRP 1 is a reader capable of transmitting reference signals (e.g., PRS) to the RFID tags. In this example, the backscatter signals from the RFID tags (e.g., TAG 1 through TAG 5) in the positioning environment 1000 are received by a UE, labeled UE 1. UE 1 may use the reference signals that are directly transmitted from TRP 1 as well as backscatter signals from the RFID tags, TAG 1 through TAG 5, to perform UE-based positioning. Additionally, or in the alternative, UE 1 may provide a measurement report for the direct and backscatter signals, which another network device may use for UE-assisted positioning. In an aspect, the measurement report may include identifiers for the RFID tags from which each backscatter signal measurement is derived.

In the example shown in FIG. 10, TRP 1 transmits one or more reference signals which are received by UE 1 and one or more of the RFID tags, TAG 1 through TAG 5. One or more of the RFID tags, TAG 1 through TAG 5, provide backscatter signals based on the reference signal transmitted by TRP 1. The backscatter signals are detected and measured by UE 1. Although FIG. 10 only shows signals associated with RFID tags TAG 1 and TAG 3, estimates for the propagation times associated with the various propagation paths in the positioning environment 1000 may be generalized based on the following equations:

$$\tau_1 = \tau_{trp1-tag1} + \tau_{tag1-ue1}$$

$$\tau_2 = \tau_{trp1-tag2} + \tau_{tag2-ue1}$$

$$\tau_3 = \tau_{trp1-tag3} + \tau_{tag3-ue1}$$

$$\tau_4 = \tau_{trp1-tag4} + \tau_{tag4-ue1}$$

$$\tau_5 = \tau_{trp1-tag5} + \tau_{tag5-ue1}$$

The propagation times $T_{trp1\text{-}tagi}$ for i=1, 2, 3, 4, 5 are known since the locations of the TRP, TRP 1, and the RFID tags, TAG 1 through TAG 5, are known. As such, the known values may be used in the foregoing equations to obtain the backscatter propagation times $T_{tagi\text{-}ue1}$ for i=1, 2, 3, 4, 5. Additionally, the direct channel downlink propagation time between TRP 1 and UE 1, $\tau_{trp1\text{-}ue}$ can be estimated. Finally, $\tau_{tagi\text{-}ue1}$ for i=1, 2, 3, 4, 5 and $\tau_{trp1\text{-}ue}$ can be used to estimate the position of UE 1 using classical TDOA positioning techniques.

Figure 11:
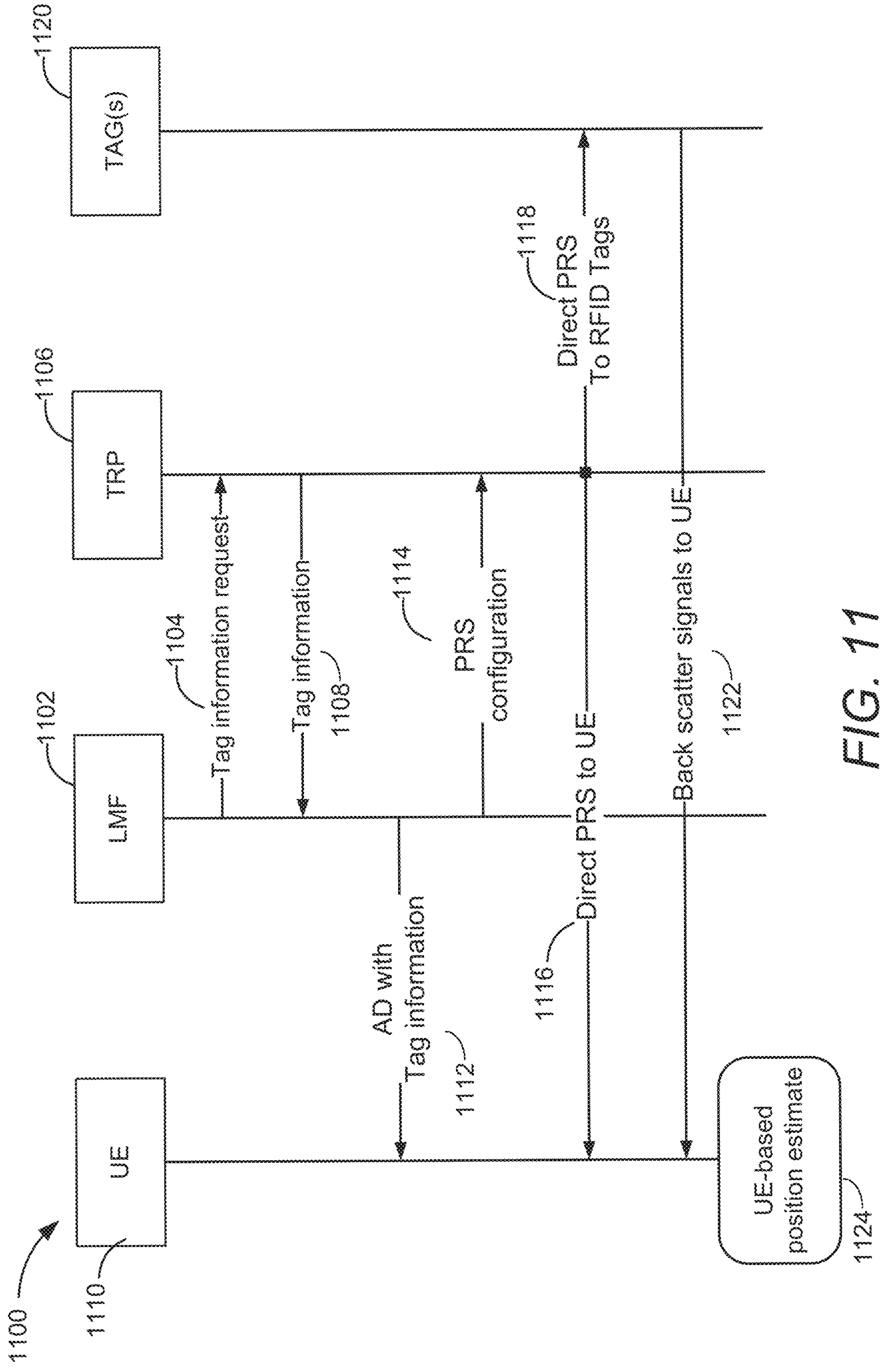
FIG. 11 shows example operations and signal flows that may be used for UE-based positioning, in accordance with aspects of the disclosure.

FIG. 11 shows example operations and signal flows 1100 that may be used for UE-based positioning, in accordance with aspects of the disclosure. In this example, a location server, such as LMF 1102, requests tag information from a TRP 1106 in communication 1104. In an aspect, the TRP 1106 already has the requested tag information or may query the RFID tags in its environment to obtain the requested tag information. The tag information may be provided by the TRP 1106 to the LMF 1102 at communication 1108. The tag information provided by the TRP 1106 may include 1) the fixed location of each tag in the positioning environment of the TRP 1106, 2) the scrambling identifiers (IDs) for the tags, 3) the bandwidth supported by the tags, 4) the number of PRS transmissions supported by the tags, 5) the sensitivity of each tag to the PRS transmitted by the TRP 1106, 6) a group delay report associated with the tags, 7) an indication as to whether frequency shifting for the backscatter and signal can be enabled/disabled by the UE 1110, 8) the frequency shifts associated with the tags, or 9) any combination of the foregoing.

The LMF 1102 may determine which of the tags will be used in a positioning session and provide the tag information for the tags to the UE 1110 in communication 1112 as assistance data. The LMF 1106 configures the PRS for the positioning session based on the tag information and sends the PRS configuration to the TRP 1106. At operations 1116 and 1118, the TRP 1106 transmits the PRS to the UE 1110 and tags 1120. At operation 1122, the tags 1120 backscatter the received PRS and the resulting backscatter signals are detected at the UE 1110. At operation 1124, the UE 1110 uses measurements of the direct PRS and the measurements of the backscatter signals to estimate the relevant channels as well as estimate its location.

Although the examples shown in FIG. 10 and FIG. 11 show the deployment of a single TRP, it will be recognized, based on the teachings of the present disclosure, that the examples may be extended to deployments with multiple TRPs where each TRP may be associated with one or more nearby tags with known locations. Multiple TRP/multiple anchor tag deployment scenarios may be used to improve the Geometric Dilution of Precision (GDOP) and improve overall positioning accuracy for target UEs in the positioning environment. The example signaling shown in FIG. 11 may be extended to multiple TRP deployments with multiple anchor tags.

Certain aspects of the disclosure are implemented with the recognition that ambient IoT devices, such as RFID tags, may be used to sense target objects in a positioning environment. In an aspect, RFID tags may be employed in the context of the RF sensing scenarios shown in FIG. 6A and FIG. 6B. In RF sensing use cases, ambient IoT devices (e.g., RFID tags) may be used to provide additional signals that are measured that can be used by the sensing entity to locate and track objects of interest, with low cost overhead.

Figure 12A:
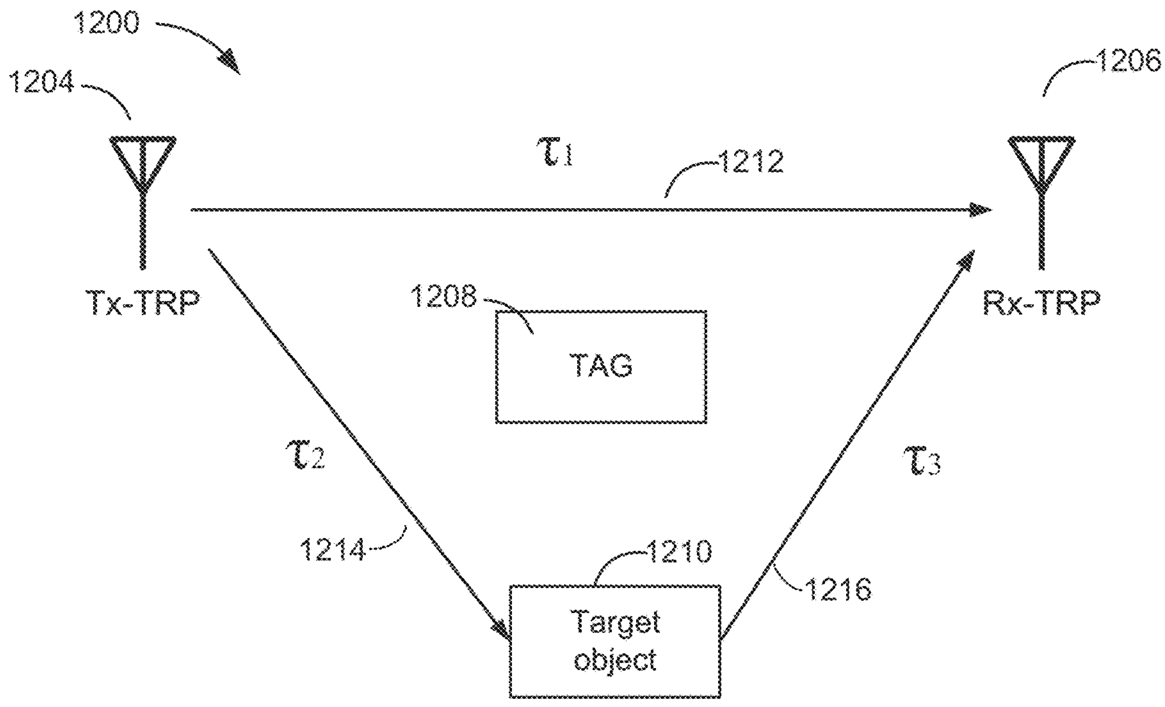
FIG. 12A and FIG. 12B show example scenarios in which an RFID tag may be used for determining a position of a target object, according to aspects of the disclosure.
Figure 12B:
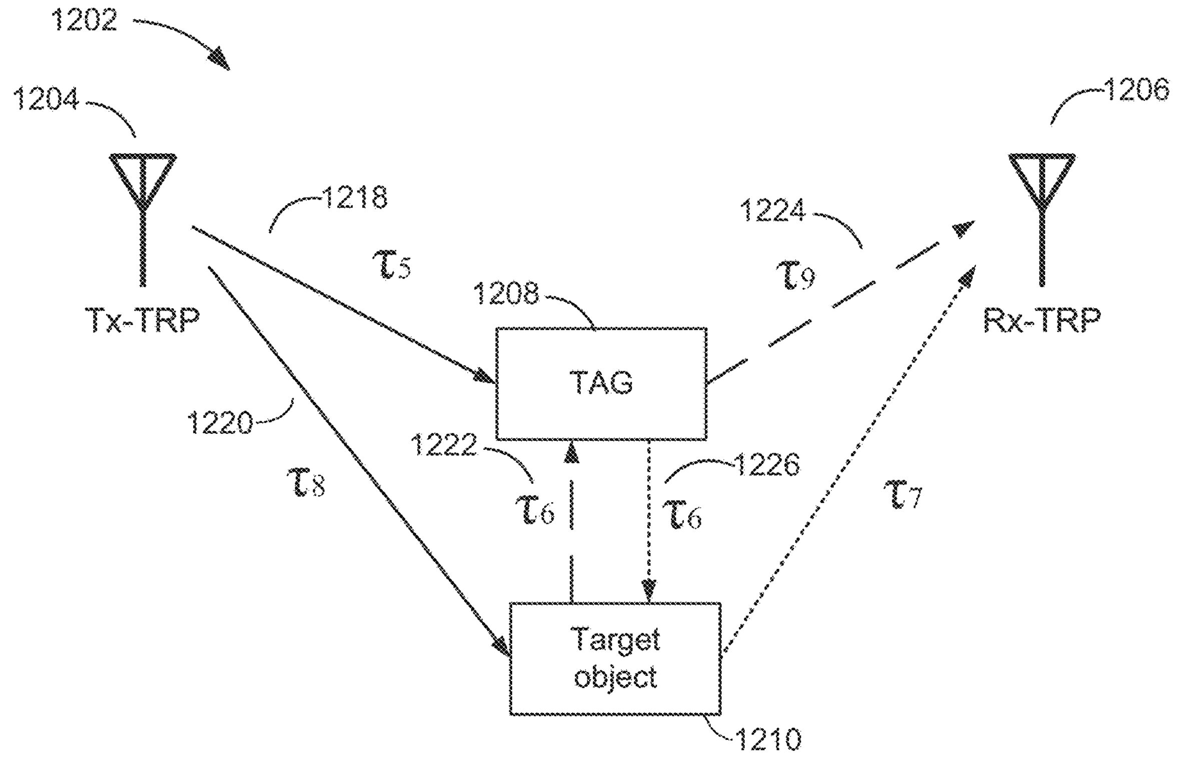

FIG. 12A and FIG. 12B show example scenarios 1200 and 1202 in which an RFID tag may be used for determining a position (e.g., range) of a target object, according to aspects of the disclosure. The example scenarios 1200 and 1202 are shown in the context of a bi-static sensing scenario but, based on the teachings of the disclosure, may be extended to mono-static and multi-static sensing scenarios.

In this example, the positioning environment includes a transmission TRP 1204, a reception TRP 1206, and RFID tag 1208, and a target object whose position is to be determined. TRP 1204, TRP 1206, and tag 1208 have known fixed locations. The operation of the tag 1208 may be modeled as a frequency shift δf of the incident reference signal received from the TRP 1204 and/or target object 1210.

For purposes of simplicity, the received signals of interest in this example may be divided into two categories: Category 1, shown in scenario 1200, and Category 2, shown in scenario 1202. Category 1 is directed to signals with 0 and $1^{st}$ order reflections that are received in an initial frequency band without a frequency shift imposed by the tag 1208. In the Category 1 scenario 1200, one or more sensing signals are transmitted from the TRP 1204 and received by the TRP 1206 along propagation path 1212. The sensing signals transmitted by the TRP 1204 are received by the TRP 1206 along propagation path 1212 with a propagation time of $\tau_1$1. Additionally, the sensing signals transmitted from the TRP 1204 are received at the target object 1210 along propagation path 1214 with a propagation time $\tau_2$. In this example, the sensing signals are reflected by the target object 1210 and received at TRP 1206 along propagation path 1216 with a propagation time $\tau_3$.

Category 2 is associated with signals having $2^{nd}$ order reflections that are frequency shifted by the tag 1208 and received by the TRP 1206 in a shifted frequency band. In scenario 1202, the sensing signals transmitted by the TRP 1204 are received at the tag 1208 along propagation path 1218 with a propagation delay of $\tau_5$. The sensing signals transmitted by the TRP 1204 are received at the target object 1210 along propagation path 1220 with a propagation time $\tau_8$. The sensing signals reflected by the target object 1210 are received at the tag 1208 along propagation path 1222 with a propagation time $\tau_6$. The reflected signals received by the tag 1208 along propagation path 1222 are provided as frequency-shifted backscatter signals to the TRP 1206 along propagation path 1224 with a propagation time $\tau_9$. The measurements by the TRP 1206 that are associated with the signals propagating along propagation paths 1220, 1222, and 1224 may be used to enhance the accuracy of the positioning estimates for the target object 1210 that would otherwise be based solely on the Category 1 signals shown in scenario 1200.

In accordance with certain aspects of the disclosure, backscatter signals reflected by the target object 1210 may also be used in the positioning estimate determinations. In scenario 1202, backscatter signals from the tag 1208 may also be received at the target object 1210 along propagation path 1226 with a propagation time of $\tau_6$ (e.g., the same propagation time associated with propagation path 1222) and reflected to the TRP 1206 along propagation path 1226 with a propagation time of $\tau_7$.

In the scenarios 1200 and 1202 shown in FIG. 12A and FIG. 12, Category 1 and Category 2 signals can be separated at the TRP 1206 by filtering since the signals associated with each category belong to separate frequency bands. Additionally, or in the alternative, the Category 1 signals and Category 2 signals may be separated based on the scrambling sequence associated with tag 1208.

The propagation times $\tau_1$ through $\tau_9$ can be used in a conventional manner to determine the position of the target object 1210. In the scenarios shown in FIG. 12A and FIG. 12B, it is assumed that the gNBs associated with TRP 1204 and TRP 1206 are synchronized. The knowledge of the tag location enables the sensing entity to filter out/eliminate paths that are not of interest, such as the paths 1218-1224. This can be done based on the estimated distance between TRP 1204 and tag 1208, the estimated distance between tag 1208 and TRP 1206, and the RF delay at the tag 1208 (to be communicated/signaled to the RF sensing entity such as TRP 1206). Additionally, if propagation path 1212 is a line of sight (LOS) path, propagation path 1212 may likewise be ignored based on the knowledge of the locations of TRP 1204 and TRP 1206, and the fact that they are synchronized.

In accordance with certain aspects of the disclosure, the "higher order reflections" may be detected and used as signals of interest in the positioning determination. However, as a practical matter, absent certain signal strength compensation techniques, such signals may be very weak and harder to detect. In certain scenarios, it may be difficult to detect higher-order reflections of the backscattered signal since the backscattered signals, particularly those associated with passive RFID devices, may have a low signal strength compared to other signals in the positioning environment.

With reference to the example shown in FIGS. 12A and 12B, the following is a mix of measurements that may be used at the sensing entity. From the Category 1 signals, the received measurements are:

$$m_1 = \tau_1$$

$$m_2 = \tau_2 + \tau_3.$$

From the Category 2 signals, the received measurements are:

$$m_3 = \tau_5 + \tau_6 + \tau_7 + \text{delay}_{tag}$$

$$m_4 = \tau_8 + \tau_6 + \tau_9 + \text{delay}_{tag},$$

where $\text{delay}_{tag}$ is the RF delay at the tag, which is known and can be subtracted based on $m_3=m_3-\text{delay}_{tag}$, $m_4=m_4-\text{delay}_{tag}$ Noting that $\tau_2=\tau_8$ and $\tau_3=\tau_7$, and that $\tau_5$ and $\tau_9$ are known, we have:

$$\tau_6 = (m_3 + m_4 - m_2 - \tau_5 - \tau_9)/2$$

Additionally, noting that $m_4-m_3-\tau_9+\tau_5=\tau_2-\tau_3$, and combining that equality with $m_2=\tau_2+\tau_3$, both $\tau_2$ and $\tau_3$ may be obtained.

As such, adding the tag 1208 in scenario 1202 contributes three additional range measurements that may be used by the sensing entity, namely, $\tau_2$, $\tau_3$, and $\tau_6$. This is in contrast with the baseline signals (Category 1 signals), where only a single measurement, namely, $\tau_2+\tau_3$ is available to the sensing entity. It will be recognized, based on the teachings of the disclosure, that adding more tags (e.g., where each may be associated with a different frequency shift) may lead to the reporting of a larger number of measurements to the sensing entity, which may lead to a greater degree of sensing accuracy.

Figure 13:
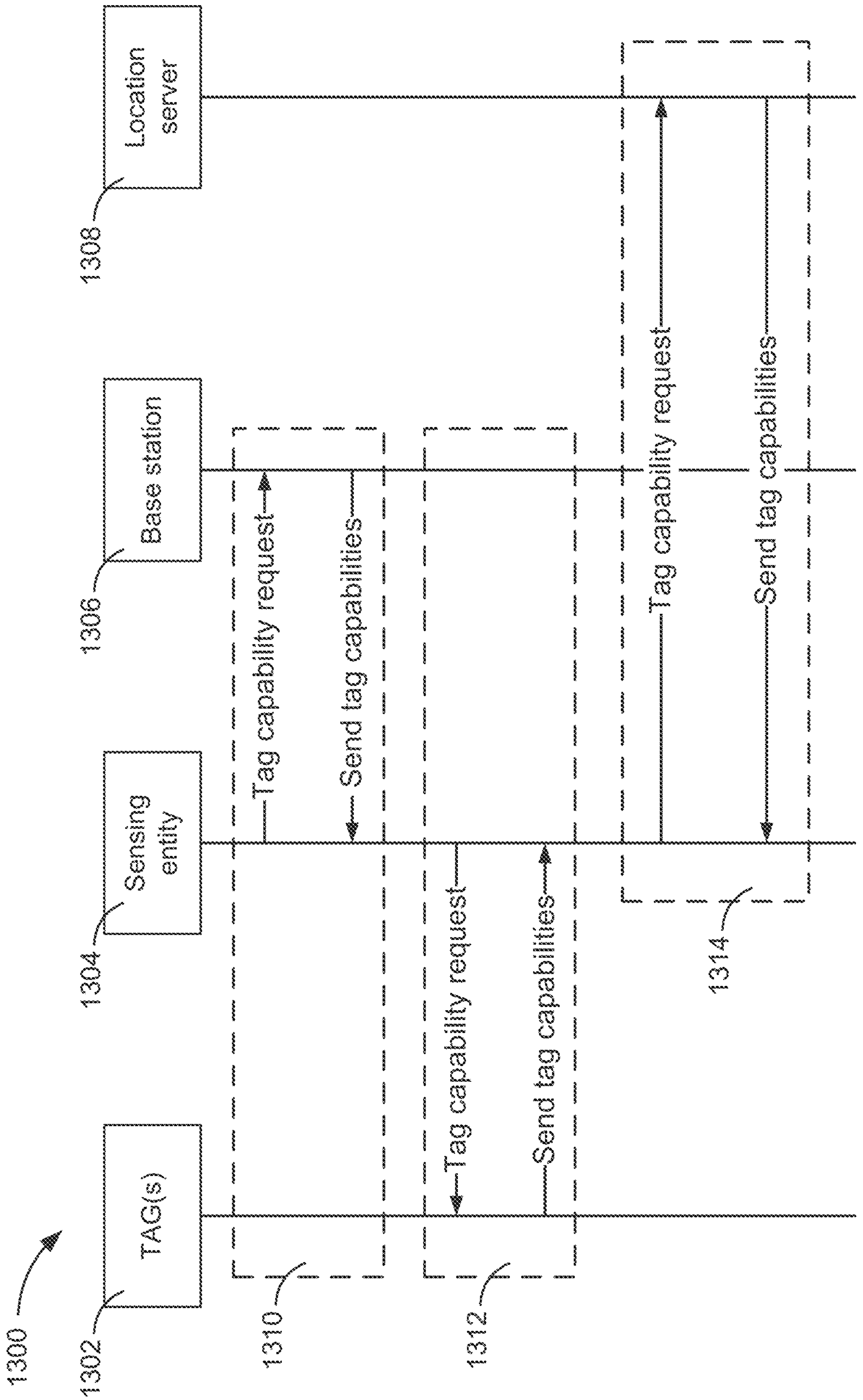
FIG. 13 is a flow diagram illustrating various examples of the manner in which tag information may be communicated to a sensing entity, according to aspects of the disclosure.

FIG. 13 is a flow diagram 1300 illustrating various examples of the manner in which tag information (e.g., tag capabilities, tag locations, and other tag information such as noted above with respect to FIG. 11) may be communicated to a sensing entity, according to aspects of the disclosure. Here, various options are available for providing the information to the sensing entity between one or more tags 1302, a sensing entity 1304, a base station 1306, and a location server 1308 (e.g., an LMF) are depicted. In the option shown at communication box 1310, the sensing entity 1304 sends a tag capability request to the base station 1306. In this option, it is assumed that the base station 1306 has been provided with the tag information or has previously queried the tags 1302 for that information.

In the option shown at communication box 1312, the sensing entity 1304 sends a tag capability request to the tags 1302, which respond to the request by transmitting their capabilities back to the sensing entity 1304. The scenario assumes that the tags 1302 may be queried by the sensing entity 1304 to transmit their tag information.

In the option shown at communication box 1314, the sensing entity 1304 sends a tag capability request to the location server 1308, which may respond by sending the pain capabilities to the sensing entity 1304. The scenario assumes that the location server 1308 has previously obtained the tag capability information from, for example, the base station 1306.

In each of the options shown in FIG. 13, the requests and responses may be blanket requests for the capabilities of all available tags or for the capabilities of a select subset of available tags. Additionally, or in the alternative, the requests and responses may be directed to the specific capabilities of all available tags or a subset of the available tags.

Figure 14:
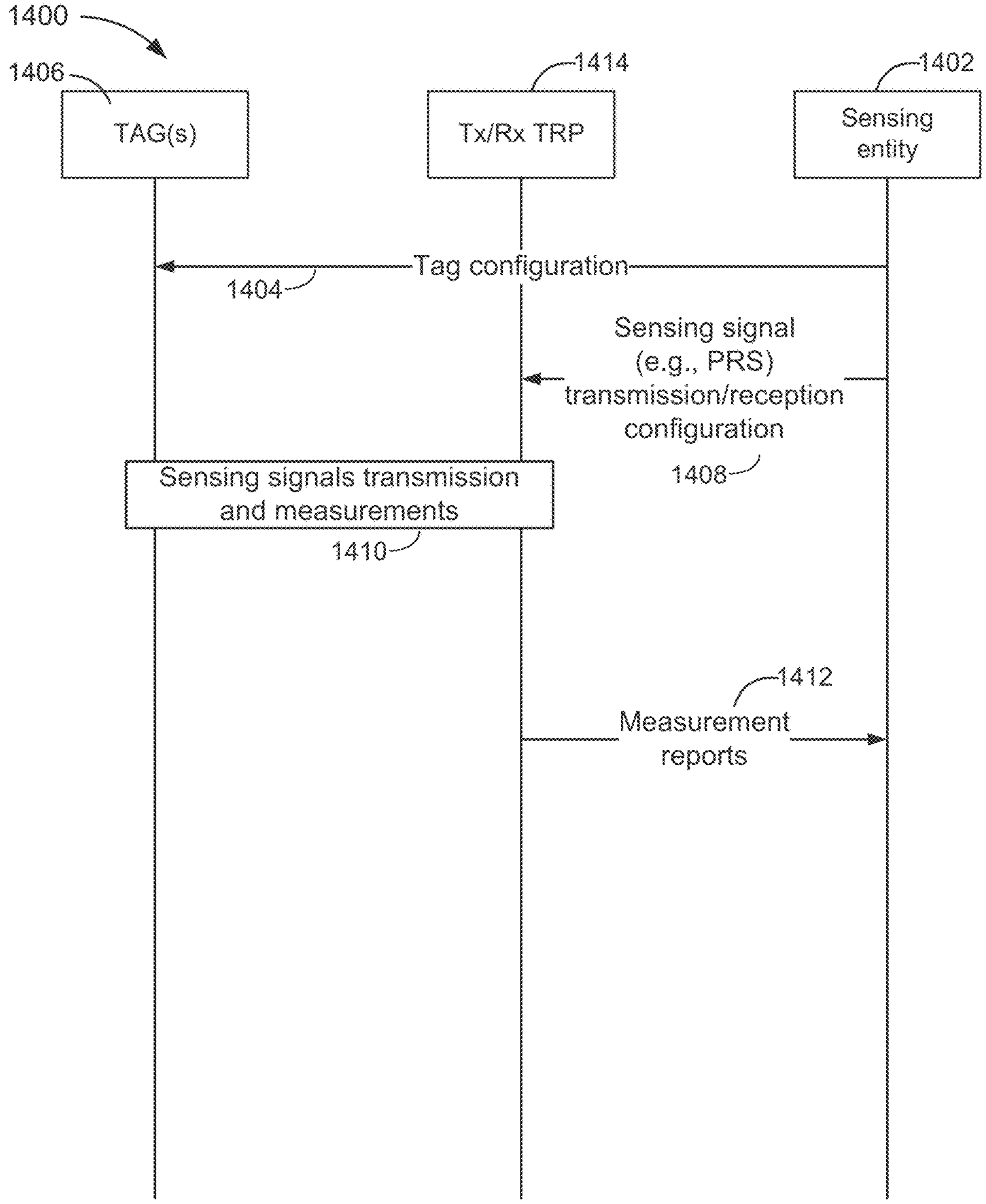
FIG. 14 is a flow diagram depicting example signaling and operations that may be executed during a sensing session, according to aspects of the disclosure.

FIG. 14 is a flow diagram 1400 depicting example signaling and operations that may be executed during a sensing session, according to aspects of the disclosure. In this example, the sensing entity 1402 may select a set of tags that are to participate in the sensing session based on the tag information obtained, for example, through one of the options shown in FIG. 13. At operation 1404, the sensing entity 1402 configures each of the selected tags 1406 with its operating parameters including, for example, a scrambling sequence and a frequency shift for the backscattered signal. In an aspect, the tag configuration parameters, the number of tags, and various sensing signal transmission/reception parameters (e.g., PRS configuration) are transmitted to TRPs 1414 and/or a base station associated with the TRPs 1414 at operation 1408. At operation 1410, the sensing signals are transmitted and measured by the TRPs 1414, which provide measurement reports to the sensing entity 1402 at operation 1412.

Figure 15:
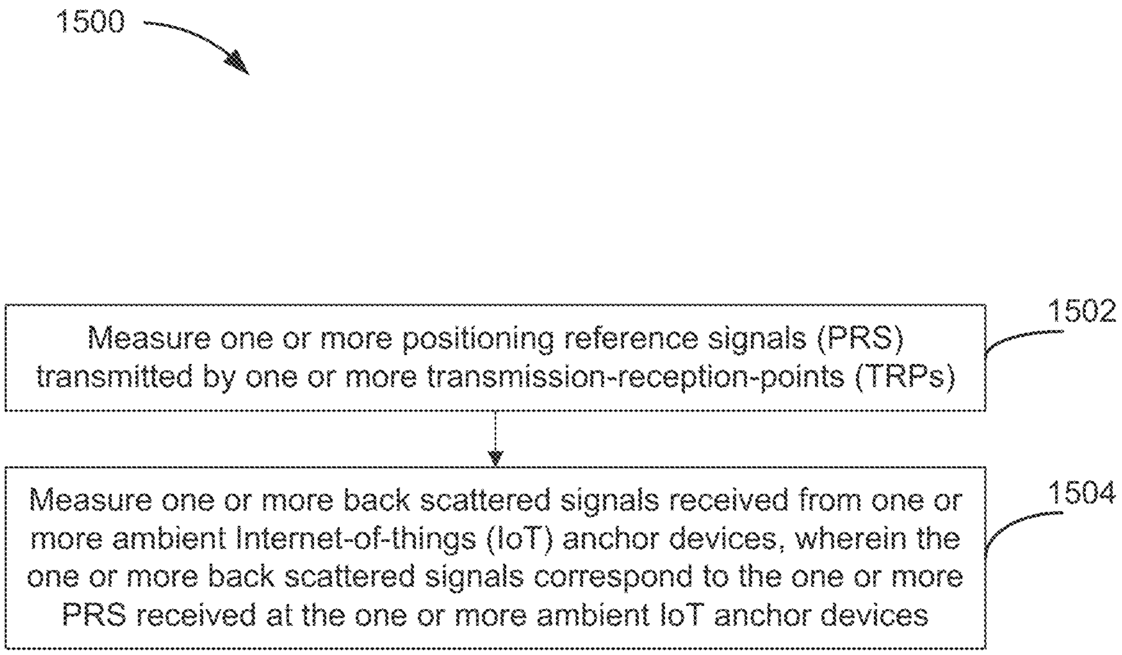
FIG. 15 illustrates an example method of wireless communication that may be performed by a UE, according to aspects of the disclosure.

FIG. 15 illustrates an example method 1500 of wireless communication that may be performed by a user equipment (UE), according to aspects of the disclosure. At operation 1502, the UE measures one or more positioning reference signals (PRS) transmitted by one or more transmission-reception-points (TRPs). In an aspect, operation 1502 may be performed by the one or more WWAN transceivers 310, the one or more processors 332, memory 340, and/or positioning component 342, any or all of which may be considered means for performing this operation.

At operation 1504, the UE measures one or more backscattered signals received from one or more ambient Internet-of-things (IoT) anchor devices, wherein the one or more backscattered signals correspond to the one or more PRS received at the one or more ambient IoT anchor devices. In an aspect, operation 1504 may be performed by the one or more WWAN transceivers 310, the one or more processors 332, memory 340, and/or positioning component 342, any or all of which may be considered means for performing this operation.

As will be appreciated, a technical advantage of the method 1500 is that ambient IoT anchor devices, such as RFID devices, may be deployed as replacements for TRPs and/or base stations in a positioning environment thereby reducing the number of costly TRPs and/or base stations needed for positioning the UE. Ambient IoT anchor devices may also be added as extra anchor points to an existing deployment leading to a reduced GDOP and consequently improved positioning accuracy at a very low cost.

Figure 16:
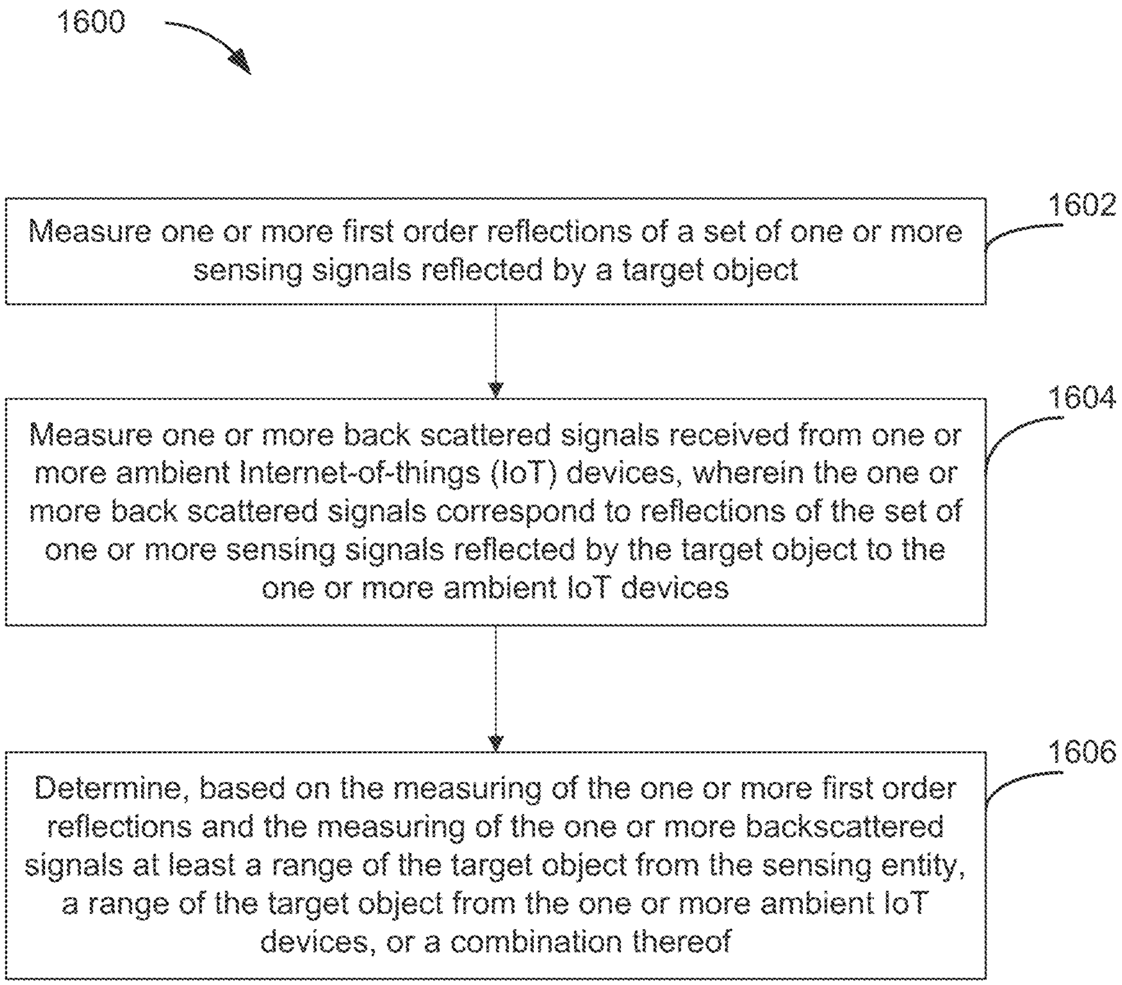
FIG. 16 illustrates an example method of wireless communication that may be performed by a sensing entity, according to aspects of the disclosure.

FIG. 16 illustrates an example method 1600 of wireless communication that may be performed by a sensing entity, according to aspects of the disclosure. At operation 1602, the sensing entity measures one or more first order reflections of a set of one or more sensing signals reflected by a target object. In an aspect, operation 1602 may be performed by the one or more network transceivers 398, the one or more processors 394, memory 396, and/or positioning component 398, any or all of which may be considered means for performing this operation.

At operation 1604, the sensing entity measures one or more backscattered signals received from one or more ambient Internet-of-things (IoT) devices, wherein the one or more backscattered signals correspond to reflections of the set of one or more sensing signals reflected by the target object to the one or more ambient IoT devices. In an aspect, operation 1604 may be performed by the one or more network transceivers 398, the one or more processors 394, memory 396, and/or positioning component 398, any or all of which may be considered means for performing this operation.

At operation 1606, the sensing entity determines, based on the measuring of the one or more first order reflections and the measuring of the one or more backscattered signals at least a range of the target object from the sensing entity, a range of the target object from the one or more ambient IoT devices, or a combination thereof. In an aspect, operation 1606 may be performed by the one or more network transceivers 398, the one or more processors 394, memory 396, and/or positioning component 398, any or all of which may be considered means for performing this operation.

As will be appreciated, a technical advantage of the method 1600 is that one or more ambient IoT devices, such as RFID devices, may be deployed in a sensing environment to increase the accuracy of positioning estimates obtained for a target object. Further, the method 1600 may be used to provide increased target detection accuracy.

Figure 17:
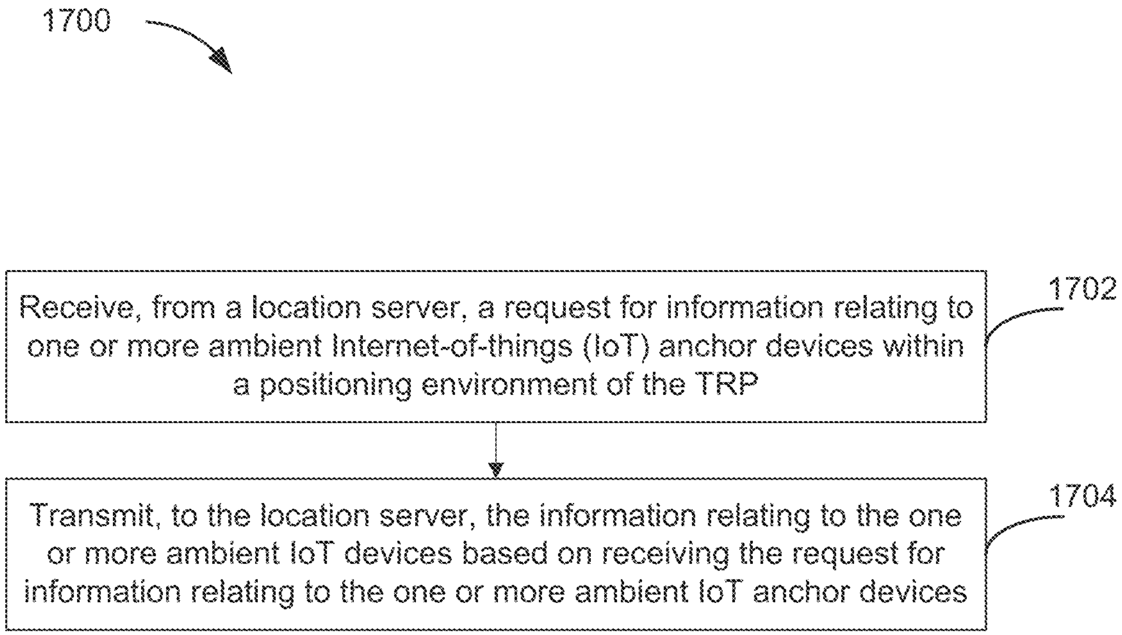
FIG. 17 illustrates an example method of wireless communication that may be performed by a transmission-reception-point (TRP), according to aspects of the disclosure.

FIG. 17 illustrates an example method 1700 of wireless communication that may be performed by a transmission-reception-point (TRP), according to aspects of the disclosure. At operation 1702, the TRP receives, from a location server (e.g., LMF), a request for information relating to one or more ambient Internet-of-things (IoT) anchor devices within a positioning environment of the TRP. In an aspect, operation 1702 may be performed by the one or more network transceivers 398, the one or more processors 394, memory 396, and/or positioning component 398, any or all of which may be considered means for performing this operation.

At operation 1704, the TRP transmits, to the location server, the information relating to the one or more ambient IoT devices based on receiving the request for information relating to the one or more ambient IoT anchor devices. In an aspect, operation 1704 may be performed by the one or more network transceivers 398, the one or more processors 394, memory 396, and/or positioning component 398, any or all of which may be considered means for performing this operation.

As will be appreciated, a technical advantage of the method 1700 is that it provides a method for signaling the transfer of information relating to one or more ambient IoT devices, such as RFID devices, that are to be used for positioning in a positioning environment.

Figure 18:
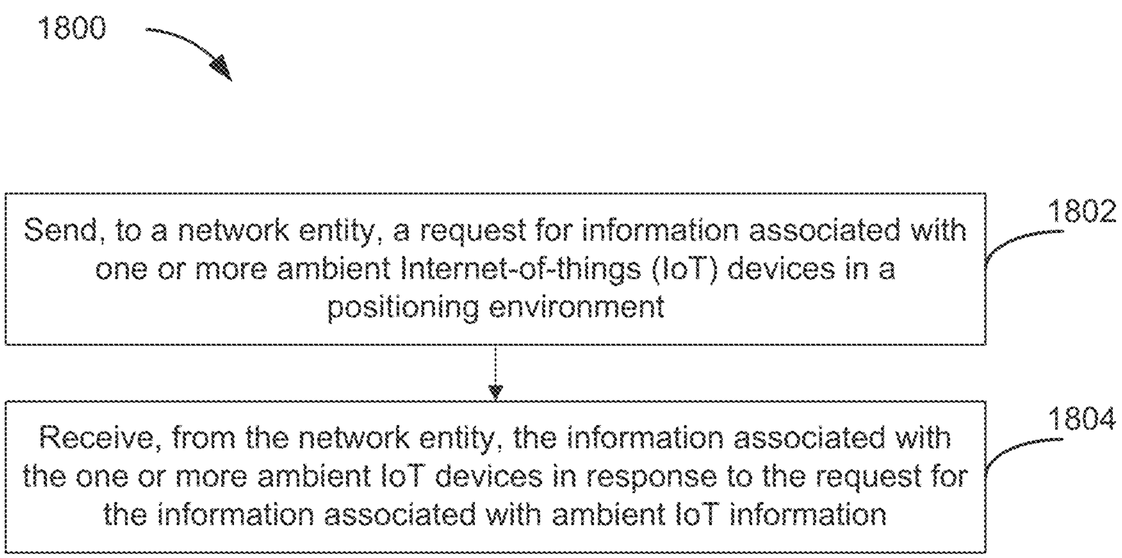
FIG. 18 illustrates an example method of wireless communication that may be performed by a sensing entity, according to aspects of the disclosure.

FIG. 18 illustrates an example method 1800 of wireless communication that may be performed by a sensing entity, according to aspects of the disclosure. At operation 1802, the sensing entity sends, to a network entity, a request for information associated with one or more ambient Internet-of-things (IoT) devices in a positioning environment. In an aspect, operation 1802 may be performed by the one or more network transceivers 398, the one or more processors 394, memory 396, and/or positioning component 398, any or all of which may be considered means for performing this operation.

At operation 1804, the sensing entity receives, from the network entity, the information associated with the one or more ambient IoT devices in response to the request for the information associated with ambient IoT information. In an aspect, operation 1804 may be performed by the one or more network transceivers 398, the one or more processors 394, memory 396, and/or positioning component 398, any or all of which may be considered means for performing this operation.

As will be appreciated, a technical advantage of the method 1800 is that it provides a method for signaling the transfer, to the sensing entity, information relating to one or more ambient IoT devices, such as RFID devices, that are to be used for positioning in a positioning environment.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: measuring one or more positioning reference signals (PRS) transmitted by one or more transmission-reception-points (TRPs); and measuring one or more backscattered signals received from one or more ambient Internet-of-things (IoT) anchor devices, wherein the one or more backscattered signals correspond to the one or more PRS received at the one or more ambient IoT anchor devices.

Clause 2. The method of clause 1, further comprising: transmitting a measurement report to a network entity based on the measuring of the one or more PRS and the measuring of the one or more backscattered signals.

Clause 3. The method of any of clauses 1 to 2, further comprising: determining a position of the UE based on the measuring of the one or more PRS and the measuring of the one or more backscattered signals.

Clause 4. The method of any of clauses 1 to 3, further comprising: receiving one or more indications corresponding to one or more scrambling sequences associated with the one or more ambient IoT anchor devices; one or more frequency shifting capabilities associated with the one or more ambient IoT anchor devices; one or more frequency shifts of the one or more backscattered signals associated with the one or more ambient IoT anchor devices; one or more bandwidths supported by the one or more ambient IoT anchor devices; a number of sensing signals supported by the one or more ambient IoT anchor devices; one or more group delays associated with the one or more ambient IoT anchor devices; one or more reflected signal sensitivities associated with the one or more ambient IoT anchor devices; one or more locations associated with the one or more ambient IoT anchor devices; or any combination thereof.

Clause 5. The method of clause 4, wherein: the one or more indications are received from a location server.

Clause 6. The method of any of clauses 1 to 5, wherein: the one or more ambient IoT anchor devices comprise a radio frequency identification (RFID) tag.

Clause 7. A method of wireless communication performed by a sensing entity, comprising: measuring one or more first order reflections of a set of one or more sensing signals reflected by a target object; measuring one or more backscattered signals received from one or more ambient Internet-of-things (IoT) devices, wherein the one or more backscattered signals correspond to reflections of the set of one or more sensing signals reflected by the target object to the one or more ambient IoT devices; and determining, based on the measuring of the one or more first order reflections and the measuring of the one or more backscattered signals at least a range of the target object from the sensing entity, a range of the target object from the one or more ambient IoT devices, or a combination thereof.

Clause 8. The method of clause 7, further comprising: measuring one or more further reflected signals reflected by the target object, wherein the one or more further reflected signals correspond to backscattered signals emitted by at least one of the one or more ambient IoT devices that are reflected by the target object.

Clause 9. The method of any of clauses 7 to 8, wherein: the one or more ambient IoT devices comprise a radio frequency identification (RFID) tag.

Clause 10. The method of any of clauses 7 to 9, wherein: the sensing entity comprises a transmission-reception-point (TRP).

Clause 11. The method of any of clauses 7 to 10, wherein: the set of one or more sensing signals reflected by the target object to the one or more ambient IoT devices are frequency shifted by the one or more ambient IoT devices to provide the one or more backscattered signals: the one or more backscattered signals are scrambled by the one or more ambient IoT devices based on one or more scrambling sequences associated with the one or more ambient IoT devices; or any combination thereof.

Clause 12. The method of any of clauses 7 to 11, further comprising: sending a request for ambient IoT device capabilities associated with the one or more ambient IoT devices; receiving the ambient IoT device capabilities associated with the one or more ambient IoT devices; or any combination thereof.

Clause 13. The method of clause 12, wherein the ambient IoT device capabilities comprise: one or more scrambling sequences associated with the one or more ambient IoT devices; one or more frequency shifting capabilities associated with the one or more ambient devices; one or more frequency shifts applied by the one or more ambient IoT devices to the reflections of the set of one or more sensing signals reflected by the target object to the one or more ambient IoT devices; one or more bandwidths supported by the one or more ambient IoT devices; one or more indications of a number of reflections of the set of one or more sensing signals reflected by the target object supported by the one or more ambient IoT devices; one or more group delays associated with the one or more ambient IoT devices; one or more reflected signal sensitivities associated with the one or more ambient IoT devices; or any combination thereof.

Clause 14. The method of any of clauses 7 to 13, further comprising: requesting ambient IoT device capabilities associated with the one or more ambient IoT devices from a base station; requesting the ambient IoT device capabilities associated with the one or more ambient IoT devices from the one or more ambient IoT devices; requesting the ambient IoT device capabilities associated with the one or more ambient IoT devices from a location server; receiving the ambient IoT device capabilities associated with the one or more ambient IoT devices from a base station; receiving the ambient IoT device capabilities associated with the one or more ambient IoT devices from the one or more ambient IoT devices; receiving the ambient IoT device capabilities associated with the one or more ambient IoT devices from the location server; or any combination thereof.

Clause 15. The method of any of clauses 7 to 14, further comprising: receiving location information associated with the one or more ambient IoT devices.

Clause 16. The method of any of clauses 7 to 15, further comprising: transmitting one or more operating parameter configurations to the one or more ambient IoT devices based on ambient IoT capabilities associated with the one or more ambient IoT devices.

Clause 17. The method of any of clauses 7 to 16, further comprising: transmitting one or more sensing signal transmission configurations to one or more transmission-reception-points (TRPs); transmitting one or more sensing signal reception configurations to the one or more TRPs; or any combination thereof.

Clause 18. The method of clause 17, further comprising: receiving one or more measurement reports from the one or more TRPs, wherein the one or more measurement reports are based on one or more measurements made by the one or more TRPs of the one or more first order reflections of the set of one or more sensing signals reflected by the target object; one or more measurements made by the one or more TRPs of the one or more backscattered signals received from the one or more ambient IoT devices; or any combination thereof.

Clause 19. The method of any of clauses 7 to 18, wherein: the one or more sensing signals comprise positioning reference signals (PRS).

Clause 20. A method of wireless communication performed by a transmission-reception-point (TRP), comprising: receiving, from a location server, a request for information relating to one or more ambient Internet-of-things (IoT) anchor devices within a positioning environment of the TRP; and transmitting, to the location server, the information relating to the one or more ambient IoT devices based on receiving the request for information relating to the one or more ambient IoT anchor devices.

Clause 21. The method of clause 20, wherein: the information relating to the one or more ambient IoT anchor devices corresponds to one or more scrambling sequences associated with the one or more ambient anchor IoT devices; one or more frequency shifting capabilities associated with the one or more ambient IoT anchor devices; one or more frequency shifts of backscattered signals associated with the one or more ambient IoT anchor devices; one or more bandwidths supported by the one or more ambient IoT anchor devices; a number of positioning reference signals (PRS) supported by the one or more ambient IoT anchor devices; one or more group delays associated with the one or more ambient IoT anchor devices; one or more reflected signal sensitivities associated with the one or more ambient IoT anchor devices; one or more locations associated with the one or more ambient IoT anchor devices; or any combination thereof.

Clause 22. The method of any of clauses 20 to 21, further comprising: transmitting one or more positioning reference signals (PRS) based on one or more PRS configurations received from the location server, wherein the one or more PRS configurations are based, at least in part, on the information relating to the one or more ambient IoT anchor devices.

Clause 23. The method of any of clauses 20 to 22, wherein: the one or more ambient IoT devices comprise a radio frequency identification (RFID) tag.

Clause 24. A method of wireless communication performed by a sensing entity, comprising: sending, to a network entity, a request for information associated with one or more ambient Internet-of-things (IoT) devices in a positioning environment; and receiving, from the network entity, the information associated with the one or more ambient IoT devices in response to the request for the information associated with ambient IoT information.

Clause 25. The method of clause 24, wherein the network entity comprises: a location server; the one or more ambient IoT devices; a base station; or a transmission-reception-point (TRP).

Clause 26. The method of any of clauses 24 to 25, wherein the information comprises: one or more scrambling sequences associated with the one or more ambient IoT devices; one or more frequency shifting capabilities associated with the one or more ambient devices; one or more frequency shifts applied by the one or more ambient IoT devices to reflections of one or more sensing signals reflected by a target object to the one or more ambient IoT devices; one or more bandwidths supported by the one or more ambient IoT devices; one or more indications of a number of reflections of the one or more sensing signals reflected by the target object supported by the one or more ambient IoT devices; one or more group delays associated with the one or more ambient IoT devices; one or more reflected signal sensitivities associated with the one or more ambient IoT devices; or any combination thereof.

Clause 27. A user equipment (UE), comprising: one or more memories; one or more transceivers; and one or more processors communicatively coupled to the one or more memories and the one or more transceivers, the one or more processors, either alone or in combination, configured to: measure one or more positioning reference signals (PRS) transmitted by one or more transmission-reception-points (TRPs); and measure one or more backscattered signals received from one or more ambient Internet-of-things (IoT) anchor devices, wherein the one or more backscattered signals correspond to the one or more PRS received at the one or more ambient IoT anchor devices.

Clause 28. The UE of clause 27, wherein the one or more processors, either alone or in combination, are further configured to: transmit, via the one or more transceivers, a measurement report to a network entity based on the measuring of the one or more PRS and the measuring of the one or more backscattered signals.

Clause 29. The UE of any of clauses 27 to 28, wherein the one or more processors, either alone or in combination, are further configured to: determine a position of the UE based on the measuring of the one or more PRS and the measuring of the one or more backscattered signals.

Clause 30. The UE of any of clauses 27 to 29, wherein the one or more processors, either alone or in combination, are further configured to: receiving one or more indications corresponding to one or more scrambling sequences associated with the one or more ambient IoT anchor devices; one or more frequency shifting capabilities associated with the one or more ambient IoT anchor devices; one or more frequency shifts of the one or more backscattered signals associated with the one or more ambient IoT anchor devices; one or more bandwidths supported by the one or more ambient IoT anchor devices; a number of sensing signals supported by the one or more ambient IoT anchor devices; one or more group delays associated with the one or more ambient IoT anchor devices; one or more reflected signal sensitivities associated with the one or more ambient IoT anchor devices; one or more locations associated with the one or more ambient IoT anchor devices; or any combination thereof.

Clause 31. The UE of clause 30, wherein: the one or more indications are received from a location server.

Clause 32. The UE of any of clauses 27 to 31, wherein: the one or more ambient IoT anchor devices comprise a radio frequency identification (RFID) tag.

Clause 33. A sensing entity, comprising: one or more memories; one or more transceivers; and one or more processors communicatively coupled to the one or more memories and the one or more transceivers, the one or more processors, either alone or in combination, configured to: measure one or more first order reflections of a set of one or more sensing signals reflected by a target object; measure one or more backscattered signals received from one or more ambient Internet-of-things (IoT) devices, wherein the one or more backscattered signals correspond to reflections of the set of one or more sensing signals reflected by the target object to the one or more ambient IoT devices; and determine, based on the measuring of the one or more first order reflections and the measuring of the one or more backscattered signals at least a range of the target object from the sensing entity, a range of the target object from the one or more ambient IoT devices, or a combination thereof.

Clause 34. The sensing entity of clause 33, wherein the one or more processors, either alone or in combination, are further configured to: measure one or more further reflected signals reflected by the target object, wherein the one or more further reflected signals correspond to backscattered signals emitted by at least one of the one or more ambient IoT devices that are reflected by the target object.

Clause 35. The sensing entity of any of clauses 33 to 34, wherein: the one or more ambient IoT devices comprise a radio frequency identification (RFID) tag.

Clause 36. The sensing entity of any of clauses 33 to 35, wherein: the sensing entity comprises a transmission-reception-point (TRP).

Clause 37. The sensing entity of any of clauses 33 to 36, wherein: the set of one or more sensing signals reflected by the target object to the one or more ambient IoT devices are frequency shifted by the one or more ambient IoT devices to provide the one or more backscattered signals: the one or more backscattered signals are scrambled by the one or more ambient IoT devices based on one or more scrambling sequences associated with the one or more ambient IoT devices; or any combination thereof.

Clause 38. The sensing entity of any of clauses 33 to 37, wherein the one or more processors, either alone or in combination, are further configured to: send, via the one or more transceivers, a request for ambient IoT device capabilities associated with the one or more ambient IoT devices; receive, via the one or more transceivers, the ambient IoT device capabilities associated with the one or more ambient IoT devices; or any combination thereof.

Clause 39. The sensing entity of clause 38, wherein the ambient IoT device capabilities comprise: one or more scrambling sequences associated with the one or more ambient IoT devices; one or more frequency shifting capabilities associated with the one or more ambient devices; one or more frequency shifts applied by the one or more ambient IoT devices to the reflections of the set of one or more sensing signals reflected by the target object to the one or more ambient IoT devices; one or more bandwidths supported by the one or more ambient IoT devices; one or more indications of a number of reflections of the set of one or more sensing signals reflected by the target object supported by the one or more ambient IoT devices; one or more group delays associated with the one or more ambient IoT devices; one or more reflected signal sensitivities associated with the one or more ambient IoT devices; or any combination thereof.

Clause 40. The sensing entity of any of clauses 33 to 39, wherein the one or more processors, either alone or in combination, are further configured to: request ambient IoT device capabilities associated with the one or more ambient IoT devices from a base station; request the ambient IoT device capabilities associated with the one or more ambient IoT devices from the one or more ambient IoT devices; request the ambient IoT device capabilities associated with the one or more ambient IoT devices from a location server; receive, via the one or more transceivers, the ambient IoT device capabilities associated with the one or more ambient IoT devices from a base station; receive, via the one or more transceivers, the ambient IoT device capabilities associated with the one or more ambient IoT devices from the one or more ambient IoT devices; receive, via the one or more transceivers, the ambient IoT device capabilities associated with the one or more ambient IoT devices from the location server; or any combination thereof.

Clause 41. The sensing entity of any of clauses 33 to 40, wherein the one or more processors, either alone or in combination, are further configured to: receive, via the one or more transceivers, location information associated with the one or more ambient IoT devices.

Clause 42. The sensing entity of any of clauses 33 to 41, wherein the one or more processors, either alone or in combination, are further configured to: transmit, via the one or more transceivers, one or more operating parameter configurations to the one or more ambient IoT devices based on ambient IoT capabilities associated with the one or more ambient IoT devices.

Clause 43. The sensing entity of any of clauses 33 to 42, wherein the one or more processors, either alone or in combination, are further configured to: transmit, via the one or more transceivers, one or more sensing signal transmission configurations to one or more transmission-reception-points (TRPs); transmit, via the one or more transceivers, one or more sensing signal reception configurations to the one or more TRPs; or any combination thereof.

Clause 44. The sensing entity of clause 43, wherein the one or more processors, either alone or in combination, are further configured to: receiving one or more measurement reports from the one or more TRPs, wherein the one or more measurement reports are based on one or more measurements made by the one or more TRPs of the one or more first order reflections of the set of one or more sensing signals reflected by the target object; one or more measurements made by the one or more TRPs of the one or more backscattered signals received from the one or more ambient IoT devices; or any combination thereof.

Clause 45. The sensing entity of any of clauses 33 to 44, wherein: the one or more sensing signals comprise positioning reference signals (PRS).

Clause 46. A transmission-reception-point (TRP), comprising: one or more memories; one or more transceivers; and one or more processors communicatively coupled to the one or more memories and the one or more transceivers, the one or more processors, either alone or in combination, configured to: receive, via the one or more transceivers, from a location server, a request for information relating to one or more ambient Internet-of-things (IoT) anchor devices within a positioning environment of the TRP; and transmit, via the one or more transceivers, to the location server, the information relating to the one or more ambient IoT devices based on receiving the request for information relating to the one or more ambient IoT anchor devices.

Clause 47. The transmission-reception-point (TRP) of clause 46, wherein: the information relating to the one or more ambient IoT anchor devices corresponds to one or more scrambling sequences associated with the one or more ambient IoT anchor devices; one or more frequency shifting capabilities associated with the one or more ambient IoT anchor devices; one or more frequency shifts of backscattered signals associated with the one or more ambient IoT anchor devices; one or more bandwidths supported by the one or more ambient IoT anchor devices; a number of positioning reference signals (PRS) supported by the one or more ambient IoT anchor devices; one or more group delays associated with the one or more ambient IoT anchor devices; one or more reflected signal sensitivities associated with the one or more ambient IoT anchor devices; one or more locations associated with the one or more ambient IoT anchor devices; or any combination thereof.

Clause 48. The TRP of any of clauses 46 to 47, wherein the one or more processors, either alone or in combination, are further configured to: transmit, via the one or more transceivers, one or more positioning reference signals (PRS) based on one or more PRS configurations received from the location server, wherein the one or more PRS configurations are based, at least in part, on the information relating to the one or more ambient IoT anchor devices.

Clause 49. The TRP of any of clauses 46 to 48, wherein: the one or more ambient IoT devices comprise a radio frequency identification (RFID) tag.

Clause 50. A sensing entity, comprising: one or more memories; one or more transceivers; and one or more processors communicatively coupled to the one or more memories and the one or more transceivers, the one or more processors, either alone or in combination, configured to: send, via the one or more transceivers, to a network entity, a request for information associated with one or more ambient Internet-of-things (IoT) devices in a positioning environment; and receive, via the one or more transceivers, from the network entity, the information associated with the one or more ambient IoT devices in response to the request for the information associated with ambient IoT information.

Clause 51. The sensing entity of clause 50, wherein the network entity comprises: a location server; the one or more ambient IoT devices; a base station; or a transmission-reception-point (TRP).

Clause 52. The sensing entity of any of clauses 50 to 51, wherein the information comprises: one or more scrambling sequences associated with the one or more ambient IoT devices; one or more frequency shifting capabilities associated with the one or more ambient devices; one or more frequency shifts applied by the one or more ambient IoT devices to reflections of one or more sensing signals reflected by a target object to the one or more ambient IoT devices; one or more bandwidths supported by the one or more ambient IoT devices; one or more indications of a number of reflections of the one or more sensing signals reflected by the target object supported by the one or more ambient IoT devices; one or more group delays associated with the one or more ambient IoT devices; one or more reflected signal sensitivities associated with the one or more ambient IoT devices; or any combination thereof.

Clause 53. A user equipment (UE), comprising: means for measuring one or more positioning reference signals (PRS) transmitted by one or more transmission-reception-points (TRPs); and means for measuring one or more backscattered signals received from one or more ambient Internet-of-things (IoT) anchor devices, wherein the one or more backscattered signals correspond to the one or more PRS received at the one or more ambient IoT anchor devices.

Clause 54. The UE of clause 53, further comprising: means for transmitting a measurement report to a network entity based on the measuring of the one or more PRS and the measuring of the one or more backscattered signals.

Clause 55. The UE of any of clauses 53 to 54, further comprising: means for determining a position of the UE based on the measuring of the one or more PRS and the measuring of the one or more backscattered signals.

Clause 56. The UE of any of clauses 53 to 55, further comprising: receiving one or more indications corresponding to one or more scrambling sequences associated with the one or more ambient IoT anchor devices; one or more frequency shifting capabilities associated with the one or more ambient IoT anchor devices; one or more frequency shifts of the one or more backscattered signals associated with the one or more ambient IoT anchor devices; one or more bandwidths supported by the one or more ambient IoT anchor devices; a number of sensing signals supported by the one or more ambient IoT anchor devices; one or more group delays associated with the one or more ambient IoT anchor devices; one or more reflected signal sensitivities associated with the one or more ambient IoT anchor devices; one or more locations associated with the one or more ambient IoT anchor devices; or any combination thereof.

Clause 57. The UE of clause 56, wherein: the one or more indications are received from a location server.

Clause 58. The UE of any of clauses 53 to 57, wherein: the one or more ambient IoT anchor devices comprise a radio frequency identification (RFID) tag.

Clause 59. A sensing entity, comprising: means for measuring one or more first order reflections of a set of one or more sensing signals reflected by a target object; means for measuring one or more backscattered signals received from one or more ambient Internet-of-things (IoT) devices, wherein the one or more backscattered signals correspond to reflections of the set of one or more sensing signals reflected by the target object to the one or more ambient IoT devices; and means for determining, based on the measuring of the one or more first order reflections and the measuring of the one or more backscattered signals at least a range of the target object from the sensing entity, a range of the target object from the one or more ambient IoT devices, or a combination thereof.

Clause 60. The sensing entity of clause 59, further comprising: means for measuring one or more further reflected signals reflected by the target object, wherein the one or more further reflected signals correspond to backscattered signals emitted by at least one of the one or more ambient IoT devices that are reflected by the target object.

Clause 61. The sensing entity of any of clauses 59 to 60, wherein: the one or more ambient IoT devices comprise a radio frequency identification (RFID) tag.

Clause 62. The sensing entity of any of clauses 59 to 61, wherein: the sensing entity comprises a transmission-reception-point (TRP).

Clause 63. The sensing entity of any of clauses 59 to 62, wherein: the set of one or more sensing signals reflected by the target object to the one or more ambient IoT devices are frequency shifted by the one or more ambient IoT devices to provide the one or more backscattered signals: the one or more backscattered signals are scrambled by the one or more ambient IoT devices based on one or more scrambling sequences associated with the one or more ambient IoT devices; or any combination thereof.

Clause 64. The sensing entity of any of clauses 59 to 63, further comprising: means for sending a request for ambient IoT device capabilities associated with the one or more ambient IoT devices; means for receiving the ambient IoT device capabilities associated with the one or more ambient IoT devices; or any combination thereof.

Clause 65. The sensing entity of clause 64, wherein the ambient IoT device capabilities comprise: one or more scrambling sequences associated with the one or more ambient IoT devices; one or more frequency shifting capabilities associated with the one or more ambient devices; one or more frequency shifts applied by the one or more ambient IoT devices to the reflections of the set of one or more sensing signals reflected by the target object to the one or more ambient IoT devices; one or more bandwidths supported by the one or more ambient IoT devices; one or more indications of a number of reflections of the set of one or more sensing signals reflected by the target object supported by the one or more ambient IoT devices; one or more group delays associated with the one or more ambient IoT devices; one or more reflected signal sensitivities associated with the one or more ambient IoT devices; or any combination thereof.

Clause 66. The sensing entity of any of clauses 59 to 65, further comprising: means for requesting ambient IoT device capabilities associated with the one or more ambient IoT devices from a base station; means for requesting the ambient IoT device capabilities associated with the one or more ambient IoT devices from the one or more ambient IoT devices; means for requesting the ambient IoT device capabilities associated with the one or more ambient IoT devices from a location server; means for receiving the ambient IoT device capabilities associated with the one or more ambient IoT devices from a base station; means for receiving the ambient IoT device capabilities associated with the one or more ambient IoT devices from the one or more ambient IoT devices; means for receiving the ambient IoT device capabilities associated with the one or more ambient IoT devices from the location server; or any combination thereof.

Clause 67. The sensing entity of any of clauses 59 to 66, further comprising: means for receiving location information associated with the one or more ambient IoT devices.

Clause 68. The sensing entity of any of clauses 59 to 67, further comprising: means for transmitting one or more operating parameter configurations to the one or more ambient IoT devices based on ambient IoT capabilities associated with the one or more ambient IoT devices.

Clause 69. The sensing entity of any of clauses 59 to 68, further comprising: means for transmitting one or more sensing signal transmission configurations to one or more transmission-reception-points (TRPs); means for transmitting one or more sensing signal reception configurations to the one or more TRPs; or any combination thereof.

Clause 70. The sensing entity of clause 69, further comprising: receiving one or more measurement reports from the one or more TRPs, wherein the one or more measurement reports are based on one or more measurements made by the one or more TRPs of the one or more first order reflections of the set of one or more sensing signals reflected by the target object; one or more measurements made by the one or more TRPs of the one or more backscattered signals received from the one or more ambient IoT devices; or any combination thereof.

Clause 71. The sensing entity of any of clauses 59 to 70, wherein: the one or more sensing signals comprise positioning reference signals (PRS).

Clause 72. A transmission-reception-point (TRP), comprising: means for receiving, from a location server, a request for information relating to one or more ambient Internet-of-things (IoT) anchor devices within a positioning environment of the TRP; and means for transmitting, to the location server, the information relating to the one or more ambient IoT devices based on receiving the request for information relating to the one or more ambient IoT anchor devices.

Clause 73. The TRP of clause 72, wherein: the information relating to the one or more ambient IoT anchor devices corresponds to one or more scrambling sequences associated with the one or more ambient IoT anchor devices; one or more frequency shifting capabilities associated with the one or more ambient IoT anchor devices; one or more frequency shifts of backscattered signals associated with the one or more ambient IoT anchor devices; one or more bandwidths supported by the one or more ambient IoT anchor devices; a number of positioning reference signals (PRS) supported by the one or more ambient IoT anchor devices; one or more group delays associated with the one or more ambient IoT anchor devices; one or more reflected signal sensitivities associated with the one or more ambient IoT anchor devices; one or more locations associated with the one or more ambient IoT anchor devices; or any combination thereof.

Clause 74. The TRP of any of clauses 72 to 73, further comprising: means for transmitting one or more positioning reference signals (PRS) based on one or more PRS configurations received from the location server, wherein the one or more PRS configurations are based, at least in part, on the information relating to the one or more ambient IoT anchor devices.

Clause 75. The TRP of any of clauses 72 to 74, wherein: the one or more ambient IoT devices comprise a radio frequency identification (RFID) tag.

Clause 76. A sensing entity, comprising: means for sending, to a network entity, a request for information associated with one or more ambient Internet-of-things (IoT) devices in a positioning environment; and means for receiving, from the network entity, the information associated with the one or more ambient IoT devices in response to the request for the information associated with ambient IoT information.

Clause 77. The sensing entity of clause 76, wherein the network entity comprises: a location server; the one or more ambient IoT devices; a base station; or a transmission-reception-point (TRP).

Clause 78. The sensing entity of any of clauses 76 to 77, wherein the information comprises: one or more scrambling sequences associated with the one or more ambient IoT devices; one or more frequency shifting capabilities associated with the one or more ambient devices; one or more frequency shifts applied by the one or more ambient IoT devices to reflections of one or more sensing signals reflected by a target object to the one or more ambient IoT devices; one or more bandwidths supported by the one or more ambient IoT devices; one or more indications of a number of reflections of the one or more sensing signals reflected by the target object supported by the one or more ambient IoT devices; one or more group delays associated with the one or more ambient IoT devices; one or more reflected signal sensitivities associated with the one or more ambient IoT devices; or any combination thereof.

Clause 79. A non-transitory computer-readable medium storing computer-executable instructions that, when executed by a user equipment (UE), cause the UE to: measure one or more positioning reference signals (PRS) transmitted by one or more transmission-reception-points (TRPs); and measure one or more backscattered signals received from one or more ambient Internet-of-things (IoT) anchor devices, wherein the one or more backscattered signals correspond to the one or more PRS received at the one or more ambient IoT anchor devices.

Clause 80. The non-transitory computer-readable medium of clause 79, further comprising computer-executable instructions that, when executed by the UE, cause the UE to: transmit a measurement report to a network entity based on the measuring of the one or more PRS and the measuring of the one or more backscattered signals.

Clause 81. The non-transitory computer-readable medium of any of clauses 79 to 80, further comprising computer-executable instructions that, when executed by the UE, cause the UE to: determine a position of the UE based on the measuring of the one or more PRS and the measuring of the one or more backscattered signals.

Clause 82. The non-transitory computer-readable medium of any of clauses 79 to 81, further comprising computer-executable instructions that, when executed by the UE, cause the UE to: receiving one or more indications corresponding to one or more scrambling sequences associated with the one or more ambient IoT anchor devices; one or more frequency shifting capabilities associated with the one or more ambient IoT anchor devices; one or more frequency shifts of the one or more backscattered signals associated with the one or more ambient IoT anchor devices; one or more bandwidths supported by the one or more ambient IoT anchor devices; a number of sensing signals supported by the one or more ambient IoT anchor devices; one or more group delays associated with the one or more ambient IoT anchor devices; one or more reflected signal sensitivities associated with the one or more ambient IoT anchor devices; one or more locations associated with the one or more ambient IoT anchor devices; or any combination thereof.

Clause 83. The non-transitory computer-readable medium of clause 82, wherein: the one or more indications are received from a location server.

Clause 84. The non-transitory computer-readable medium of any of clauses 79 to 83, wherein: the one or more ambient IoT anchor devices comprise a radio frequency identification (RFID) tag.

Clause 85. A non-transitory computer-readable medium storing computer-executable instructions that, when executed by a sensing entity, cause the sensing entity to: measure one or more first order reflections of a set of one or more sensing signals reflected by a target object; measure one or more backscattered signals received from one or more ambient Internet-of-things (IoT) devices, wherein the one or more backscattered signals correspond to reflections of the set of one or more sensing signals reflected by the target object to the one or more ambient IoT devices; and determine, based on the measuring of the one or more first order reflections and the measuring of the one or more backscattered signals at least a range of the target object from the sensing entity, a range of the target object from the one or more ambient IoT devices, or a combination thereof.

Clause 86. The non-transitory computer-readable medium of clause 85, further comprising computer-executable instructions that, when executed by the sensing entity, cause the sensing entity to: measure one or more further reflected signals reflected by the target object, wherein the one or more further reflected signals correspond to backscattered signals emitted by at least one of the one or more ambient IoT devices that are reflected by the target object.

Clause 87. The non-transitory computer-readable medium of any of clauses 85 to 86, wherein: the one or more ambient IoT devices comprise a radio frequency identification (RFID) tag.

Clause 88. The non-transitory computer-readable medium of any of clauses 85 to 87, wherein: the sensing entity comprises a transmission-reception-point (TRP).

Clause 89. The non-transitory computer-readable medium of any of clauses 85 to 88, wherein: the set of one or more sensing signals reflected by the target object to the one or more ambient IoT devices are frequency shifted by the one or more ambient IoT devices to provide the one or more backscattered signals: the one or more backscattered signals are scrambled by the one or more ambient IoT devices based on one or more scrambling sequences associated with the one or more ambient IoT devices; or any combination thereof.

Clause 90. The non-transitory computer-readable medium of any of clauses 85 to 89, further comprising computer-executable instructions that, when executed by the sensing entity, cause the sensing entity to: send a request for ambient IoT device capabilities associated with the one or more ambient IoT devices; receive the ambient IoT device capabilities associated with the one or more ambient IoT devices; or any combination thereof.

Clause 91. The non-transitory computer-readable medium of clause 90, wherein the ambient IoT device capabilities comprise: one or more scrambling sequences associated with the one or more ambient IoT devices; one or more frequency shifting capabilities associated with the one or more ambient devices; one or more frequency shifts applied by the one or more ambient IoT devices to the reflections of the set of one or more sensing signals reflected by the target object to the one or more ambient IoT devices; one or more bandwidths supported by the one or more ambient IoT devices; one or more indications of a number of reflections of the set of one or more sensing signals reflected by the target object supported by the one or more ambient IoT devices; one or more group delays associated with the one or more ambient IoT devices; one or more reflected signal sensitivities associated with the one or more ambient IoT devices; or any combination thereof.

Clause 92. The non-transitory computer-readable medium of any of clauses 85 to 91, further comprising computer-executable instructions that, when executed by the sensing entity, cause the sensing entity to: request ambient IoT device capabilities associated with the one or more ambient IoT devices from a base station; request the ambient IoT device capabilities associated with the one or more ambient IoT devices from the one or more ambient IoT devices; request the ambient IoT device capabilities associated with the one or more ambient IoT devices from a location server; receive the ambient IoT device capabilities associated with the one or more ambient IoT devices from a base station; receive the ambient IoT device capabilities associated with the one or more ambient IoT devices from the one or more ambient IoT devices; receive the ambient IoT device capabilities associated with the one or more ambient IoT devices from the location server; or any combination thereof.

Clause 93. The non-transitory computer-readable medium of any of clauses 85 to 92, further comprising computer-executable instructions that, when executed by the sensing entity, cause the sensing entity to: receive location information associated with the one or more ambient IoT devices.

Clause 94. The non-transitory computer-readable medium of any of clauses 85 to 93, further comprising computer-executable instructions that, when executed by the sensing entity, cause the sensing entity to: transmit one or more operating parameter configurations to the one or more ambient IoT devices based on ambient IoT capabilities associated with the one or more ambient IoT devices.

Clause 95. The non-transitory computer-readable medium of any of clauses 85 to 94, further comprising computer-executable instructions that, when executed by the sensing entity, cause the sensing entity to: transmit one or more sensing signal transmission configurations to one or more transmission-reception-points (TRPs); transmit one or more sensing signal reception configurations to the one or more TRPs; or any combination thereof.

Clause 96. The non-transitory computer-readable medium of clause 95, further comprising computer-executable instructions that, when executed by the sensing entity, cause the sensing entity to: receiving one or more measurement reports from the one or more TRPs, wherein the one or more measurement reports are based on one or more measurements made by the one or more TRPs of the one or more first order reflections of the set of one or more sensing signals reflected by the target object; one or more measurements made by the one or more TRPs of the one or more backscattered signals received from the one or more ambient IoT devices; or any combination thereof.

Clause 97. The non-transitory computer-readable medium of any of clauses 85 to 96, wherein: the one or more sensing signals comprise positioning reference signals (PRS).

Clause 98. A non-transitory computer-readable medium storing computer-executable instructions that, when executed by an transmission-reception-point (TRP), cause the TRP to: receive, from a location server, a request for information relating to one or more ambient Internet-of-things (IoT) anchor devices within a positioning environment of the TRP; and transmit, to the location server, the information relating to the one or more ambient IoT devices based on receiving the request for information relating to the one or more ambient IoT anchor devices.

Clause 99. The non-transitory computer-readable medium of clause 98, wherein: the information relating to the one or more ambient IoT anchor devices corresponds to one or more scrambling sequences associated with the one or more ambient IoT anchor devices; one or more frequency shifting capabilities associated with the one or more ambient IoT anchor devices; one or more frequency shifts of backscattered signals associated with the one or more ambient IoT anchor devices; one or more bandwidths supported by the one or more ambient IoT anchor devices; a number of positioning reference signals (PRS) supported by the one or more ambient IoT anchor devices; one or more group delays associated with the one or more ambient IoT anchor devices; one or more reflected signal sensitivities associated with the one or more ambient IoT anchor devices; one or more locations associated with the one or more ambient IoT anchor devices; or any combination thereof.

Clause 100. The non-transitory computer-readable medium of any of clauses 98 to 99, further comprising computer-executable instructions that, when executed by the TRP, cause the TRP to: transmit one or more positioning reference signals (PRS) based on one or more PRS configurations received from the location server, wherein the one or more PRS configurations are based, at least in part, on the information relating to the one or more ambient IoT anchor devices.

Clause 101. The non-transitory computer-readable medium of any of clauses 98 to 100, wherein: the one or more ambient IoT devices comprise a radio frequency identification (RFID) tag.

Clause 102. A non-transitory computer-readable medium storing computer-executable instructions that, when executed by a sensing entity, cause the sensing entity to: send, to a network entity, a request for information associated with one or more ambient Internet-of-things (IoT) devices in a positioning environment; and receive, from the network entity, the information associated with the one or more ambient IoT devices in response to the request for the information associated with ambient IoT information.

Clause 103. The non-transitory computer-readable medium of clause 102, wherein the network entity comprises: a location server; the one or more ambient IoT devices; a base station; or a transmission-reception-point (TRP).

Clause 104. The non-transitory computer-readable medium of any of clauses 102 to 103, wherein the information comprises: one or more scrambling sequences associated with the one or more ambient IoT devices; one or more frequency shifting capabilities associated with the one or more ambient devices; one or more frequency shifts applied by the one or more ambient IoT devices to reflections of one or more sensing signals reflected by a target object to the one or more ambient IoT devices; one or more bandwidths supported by the one or more ambient IoT devices; one or more indications of a number of reflections of the one or more sensing signals reflected by the target object supported by the one or more ambient IoT devices; one or more group delays associated with the one or more ambient IoT devices; one or more reflected signal sensitivities associated with the one or more ambient IoT devices; or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method of wireless communication performed by a user equipment (UE), comprising:

measuring one or more positioning reference signals (PRS) transmitted by one or more transmission-reception-points (TRPs); and measuring one or more backscattered signals received from one or more ambient Internet-of-things (IoT) anchor devices, wherein the one or more backscattered signals correspond to the one or more PRS received at the one or more ambient IoT anchor devices;

determining a position of the UE based on the measuring of the one or more PRS and the measuring of the one or more backscattered signals; and transmitting a measurement report to a network entity based on determining propagation times from the measuring of the one or more PRS and the measuring of the one or more backscattered signals.

2. The method of claim 1, further comprising:

receiving one or more indications corresponding to one or more scrambling sequences associated with the one or more ambient IoT anchor devices;

one or more frequency shifting capabilities associated with the one or more ambient IoT anchor devices;

one or more frequency shifts of the one or more backscattered signals associated with the one or more ambient IoT anchor devices;

one or more bandwidths supported by the one or more ambient IoT anchor devices;

a number of sensing signals supported by the one or more ambient IoT anchor devices;

one or more group delays associated with the one or more ambient IoT anchor devices;

one or more reflected signal sensitivities associated with the one or more ambient IoT anchor devices;

one or more locations associated with the one or more ambient IoT anchor devices; or any combination thereof.

3. The method of claim 2, wherein:

the one or more indications are received from a location server.

4. The method of claim 1, wherein:

the one or more ambient IoT anchor devices comprise a radio frequency identification (RFID) tag.

5. A method of wireless communication performed by a sensing entity, comprising:

measuring one or more first order reflections of a set of one or more sensing signals reflected by a target object;

measuring one or more backscattered signals received from one or more ambient Internet-of-things (IoT) devices, wherein the one or more backscattered signals correspond to reflections of the set of one or more sensing signals reflected by the target object to the one or more ambient IoT devices;

determining a position of the UE based on the measuring of the one or more PRS and the measuring of the one or more backscattered signals; and determining, based on determining propagation times from the measuring of the one or more first order reflections and the measuring of the one or more backscattered signals at least a range of the target object from the sensing entity, a range of the target object from the one or more ambient IoT devices, or a combination thereof.

6. The method of claim 5, further comprising:

measuring one or more further reflected signals reflected by the target object, wherein the one or more further reflected signals correspond to backscattered signals emitted by at least one of the one or more ambient IoT devices that are reflected by the target object.

7. The method of claim 5, wherein:

the one or more ambient IoT devices comprise a radio frequency identification (RFID) tag.

8. The method of claim 5, wherein:

the sensing entity comprises a transmission-reception-point (TRP).

9. The method of claim 5, wherein:

the set of one or more sensing signals reflected by the target object to the one or more ambient IoT devices are frequency shifted by the one or more ambient IoT devices to provide the one or more backscattered signals:

the one or more backscattered signals are scrambled by the one or more ambient IoT devices based on one or more scrambling sequences associated with the one or more ambient IoT devices; or any combination thereof.

10. The method of claim 5, further comprising:

sending a request for ambient IoT device capabilities associated with the one or more ambient IoT devices;

receiving the ambient IoT device capabilities associated with the one or more ambient IoT devices; or any combination thereof.

11. The method of claim 10, wherein the ambient IOT device capabilities comprise:

one or more scrambling sequences associated with the one or more ambient IoT devices;

one or more frequency shifting capabilities associated with the one or more ambient devices;

one or more frequency shifts applied by the one or more ambient IoT devices to the reflections of the set of one or more sensing signals reflected by the target object to the one or more ambient IoT devices;

one or more bandwidths supported by the one or more ambient IoT devices;

one or more indications of a number of reflections of the set of one or more sensing signals reflected by the target object supported by the one or more ambient IoT devices;

one or more group delays associated with the one or more ambient IoT devices;

one or more reflected signal sensitivities associated with the one or more ambient IoT devices; or any combination thereof.

12. The method of claim 5, further comprising:

requesting ambient IoT device capabilities associated with the one or more ambient IoT devices from a base station;

requesting the ambient IoT device capabilities associated with the one or more ambient IoT devices from the one or more ambient IoT devices;

requesting the ambient IoT device capabilities associated with the one or more ambient IoT devices from a location server;

receiving the ambient IoT device capabilities associated with the one or more ambient IoT devices from a base station;

receiving the ambient IoT device capabilities associated with the one or more ambient IoT devices from the one or more ambient IoT devices;

receiving the ambient IoT device capabilities associated with the one or more ambient IoT devices from the location server; or any combination thereof.

13. The method of claim 5, further comprising:

receiving location information associated with the one or more ambient IoT devices.

14. The method of claim 5, further comprising:

transmitting one or more operating parameter configurations to the one or more ambient IoT devices based on ambient IoT capabilities associated with the one or more ambient IoT devices.

15. The method of claim 5, further comprising:

transmitting one or more sensing signal transmission configurations to one or more transmission-reception-points (TRPs);

transmitting one or more sensing signal reception configurations to the one or more TRPs; or any combination thereof.

16. The method of claim 15, further comprising:

receiving one or more measurement reports from the one or more TRPs, wherein the one or more measurement reports are based on one or more measurements made by the one or more TRPs of the one or more first order reflections of the set of one or more sensing signals reflected by the target object;

one or more measurements made by the one or more TRPs of the one or more backscattered signals received from the one or more ambient IoT devices; or any combination thereof.

17. The method of claim 5, wherein:

the one or more sensing signals comprise positioning reference signals (PRS).

* * * * *